United States Patent
Corten et al.

(10) Patent No.: US 10,988,567 B2
(45) Date of Patent: Apr. 27, 2021

(54) AQUEOUS DISPERSIONS CONTAINING POLYMERIZATES PRODUCED IN MULTIPLE STAGES AND COATING AGENT COMPOSITIONS CONTAINING SAME

(71) Applicant: BASF Coatings GmbH, Münster (DE)

(72) Inventors: Cathrin Corten, Muenster (DE); Dirk Eierhoff, Muenster (DE); Britta Schnieders, Muenster (DE); Nicole Freitag, Muenster (DE); Heinz-Ulrich Grumpe, Muenster (DE); Mechthild Vienenkoetter, Muenster (DE); Ralf Nickolaus, Muenster (DE)

(73) Assignee: BASF Coatings GmbH, Münster (DE)

( * ) Notice: Subject to any disclaimer, the term of this patent is extended or adjusted under 35 U.S.C. 154(b) by 152 days.

(21) Appl. No.: 16/081,293

(22) PCT Filed: Feb. 23, 2017

(86) PCT No.: PCT/EP2017/054203
§ 371 (c)(1),
(2) Date: Aug. 30, 2018

(87) PCT Pub. No.: WO2017/148796
PCT Pub. Date: Sep. 8, 2017

(65) Prior Publication Data
US 2019/0085116 A1 Mar. 21, 2019
US 2020/0199284 A9 Jun. 25, 2020

(30) Foreign Application Priority Data

Mar. 1, 2016 (EP) ..................... 16157995

(51) Int. Cl.
| | |
|---|---|
| *C08G 18/42* | (2006.01) |
| *C08G 18/66* | (2006.01) |
| *C08G 18/76* | (2006.01) |
| *B05D 7/00* | (2006.01) |
| *B05D 7/14* | (2006.01) |
| *C09D 175/04* | (2006.01) |
| *C08G 18/12* | (2006.01) |
| *C08G 18/32* | (2006.01) |

(52) U.S. Cl.
CPC .......... *C08G 18/4233* (2013.01); *B05D 7/14* (2013.01); *B05D 7/532* (2013.01); *C08G 18/664* (2013.01); *C08G 18/765* (2013.01); *C09D 175/04* (2013.01); *B05D 2401/20* (2013.01); *B05D 2503/00* (2013.01); *B05D 2601/02* (2013.01); *C08G 18/12* (2013.01); *C08G 18/3275* (2013.01)

(58) Field of Classification Search
CPC .. C08G 18/4233; C08G 18/664; C08G 18/12; C08G 18/765; B05D 7/532; B05D 7/14
See application file for complete search history.

(56) References Cited

U.S. PATENT DOCUMENTS

2004/0134791 A1* 7/2004 Toi .................... C09D 133/066
205/196

FOREIGN PATENT DOCUMENTS

| | | |
|---|---|---|
| DE | 4009858 A1 | 10/1991 |
| DE | 4437535 A1 | 4/1996 |
| DE | 19914896 A1 | 10/2000 |
| DE | 19930665 A1 | 1/2001 |
| DE | 19948004 A1 | 7/2001 |
| DE | 10043405 C1 | 6/2002 |
| EP | 0228003 A1 | 7/1987 |
| EP | 0521928 B1 | 8/1994 |
| EP | 0634431 A1 | 1/1995 |
| JP | H06176726 A | 6/1994 |
| WO | 9115528 A1 | 10/1991 |
| WO | 9215405 A1 | 9/1992 |
| WO | 2005111100 A1 | 11/2005 |
| WO | WO-2005111100 A1 * | 11/2005 ............ C08F 212/08 |
| WO | 2006104664 A1 | 10/2006 |
| WO | WO-2006104664 A1 * | 10/2006 ........... C09D 175/16 |

OTHER PUBLICATIONS

International Search Report for International Patent Application No. PCT/EP2017/054203, dated Apr. 10, 2017, 3 pages.
Chai, et al., "Determination of the solubility of a monomer in water by multiple headspace extraction gas chromatography", Journal of Applied Polymer Science, vol. 99, Issue 3, Feb. 2006, pp. 1296-1301.
European Search Report for EP Patent Application No. 16157995.8, dated May 20, 2016, 3 pages.
Hong, et al., "Core/Shell Acrylic Microgel as the Main Binder of Waterborne Metallic Basecoats", Korea Polymer Journal, vol. 7, Issue 4, Aug. 30, 1999, pp. 213-222.

* cited by examiner

*Primary Examiner* — Robert D Harlan
(74) *Attorney, Agent, or Firm* — Armstrong Teasdale LLP

(57) ABSTRACT

The present invention relates to aqueous dispersions comprising multistage-prepared polymers of olefinically unsaturated compounds and to the preparation and use thereof, in particular in the field of automobile coating.

14 Claims, No Drawings

AQUEOUS DISPERSIONS CONTAINING POLYMERIZATES PRODUCED IN MULTIPLE STAGES AND COATING AGENT COMPOSITIONS CONTAINING SAME

CROSS-REFERENCE TO RELATED APPLICATIONS

This application is a U.S. National Phase Application of International Patent Application No. PCT/EP2017/054203, filed Feb. 23, 2017, which claims the benefit of priority to European Patent Application No. 16157995.8, filed Mar. 1, 2016, the entire contents of which are hereby incorporated by reference herein.

The present invention relates to aqueous dispersions comprising multistage-prepared polymers of olefinically unsaturated compounds, and also to their preparation and use, especially within the field of automotive finishing.

BACKGROUND

Known from the prior art are polymers which can be used as binders for automotive finishing. A binder of this kind is required to fulfill a multiplicity of properties. It must, for instance, be capable of being used in modern multicoat paint systems of the kind employed in the automobile industry.

The prior art (cf., e.g., German patent application DE 199 48 004 A1, page 17, line 37 to page 19, line 22, or German patent DE 100 43 405 C1, column 3, paragraph [0018], and column 8, paragraph [0052] to column 9, paragraph [0057], in conjunction with column 6, paragraph [0039] to column 8, paragraph [0050]) has disclosed the following process, in which
(1) a pigmented aqueous basecoat material is applied to a substrate,
(2) a polymer film is formed from the coating material applied in stage (1),
(3) a clearcoat material is applied to the resulting basecoat film, and subsequently
(4) the basecoat film is cured together with the clearcoat film,
to give a multicoat paint system.

This process is widely employed, for example, not only for the OEM (original) finishing of automobiles but also for the painting of ancillary components made from metal and plastic.

The resulting multicoat paint system is required to fulfill a multiplicity of properties.

Where coating defects occur, the vehicle bodies are coated a second time with the basecoat and clearcoat materials by the aforementioned process. In this coating procedure, in OEM automotive refinishing, the coating material used may be the same as for the first coating. Also possible, however, is the use of a clearcoat material which cures not at high temperatures (around 140° C.) but instead at much lower temperatures (about 80° C.). The resultant paint system must meet the high demands of the automobile industry for appearance and stability; the adhesion between the original finish and the basecoat material used in the refinishing operation may present particular difficulties.

A polymer which has been known in the prior art for many years, and which even now has retained high relevance as a binder in automotive OEM finishing, is a polyurethane which is known from WO 92/15405. This binder is used with the aim of improving the refinish adhesion, and can therefore serve as a reference for adhesion properties.

In Korea Polymer Journal (Korea Polym. J., vol. 7, no. 4, pp. 213-222) Hong, Kim, Kim and Park describe polymers of multistage construction for use as binders in metallic finishes. These polymers are produced via an operation in which the first stage of the polymer is prepared by a batch operation and the second and third stages are each carried out as starved feed polymerizations.

SUMMARY

The problem addressed with the present invention, then, was that of providing a polymer which can be used to produce coatings which resolve the difficulties described above.

By this is meant an improved adhesion both for the painting of metallic and plastics substrates and also, in particular, for automotive refinish, for the case both of OEM clearcoat materials with a baking temperature of generally about 140° C. and of refinish clearcoat materials with a baking temperature of in general about 80° C. In the context of improving adhesion, the focus is on the improved adhesion between basecoat and original finish. It is this adhesion which is to be improved in particular for use in OEM automotive refinishing.

The adhesion difficulties are especially striking when the coated substrates are exposed to weathering. The problem addressed by the present invention was therefore also that of providing a polymer for coatings which possess outstanding adhesion properties even after having been exposed to weathering.

Weathering is often a precursor of other difficulties, especially blisters and swelling. A further problem addressed by the present invention, therefore, was that of preventing or reducing incidence of blisters and swelling.

In addition to the adhesion improvements described, the problem addressed by the present invention was that of providing polymers which when used in coating materials display improved properties in terms of storage stability of the coating materials, as compared with the prior art.

Another problem addressed by the present invention was that of providing a polymer which when used in coating materials fulfills the requirements of automotive OEM finishing in terms of target flop in the case of effect finishes, in terms of sufficiently high solids for obtaining sufficiently high film thicknesses, and in terms of a viscosity which permits processing by means of electrostatic and/or pneumatic application.

It has emerged that the problems described above can be solved by an aqueous dispersion comprising at least one polymer and preparable by
i. polymerizing a mixture of olefinically unsaturated monomers A by emulsion polymerization in water, using at least one emulsifier and at least one water-soluble initiator, where
  a polymer prepared from the monomers A has a glass transition temperature of 10 to 55° C.,
ii. polymerizing a mixture of olefinically unsaturated monomers B by emulsion polymerization in water, using at least one emulsifier and at least one water-soluble initiator, in the presence of the polymer obtained under i., where
  a monomers concentration of 6.0 wt % in the reaction solution is not exceeded throughout the reaction period, and
  the mixture of olefinically unsaturated monomers B comprises at least one polyolefinically unsaturated monomer, iii. polymerizing a mixture of olefinically unsaturated monomers C by emulsion polymerization in water, using at least one emulsifier and at least one water-soluble initiator, in the presence of the polymer obtained under ii., where
a monomers concentration of 6.0 wt % in the reaction solution is not exceeded throughout the reaction period, and
iv. adjusting the pH of the reaction solution to a pH of 6.5 to 9.0,
wherein
a. the mixture of olefinically unsaturated monomers A comprises from 0 wt % to less than 50.0 wt % of one or more monomers having a solubility in water of <0.5 g/l at 25° C.,
a monomers A concentration of 6.0 wt % in the reaction solution from stage i. is not exceeded,
and the resulting polymer after stage i. has a particle size of 20 to 110 nm,
b. a polymer prepared from the monomers B has a glass transition temperature of −35 to 12° C., and
the resulting polymer after stage ii. has a particle size of 130 to 200 nm,
c. a polymer prepared from the monomers C has a glass transition temperature of −50 to 15° C., and
the resulting polymer after stage iii. has a particle size of 150 to 280 nm.

The new aqueous dispersion comprising at least one polymer is also referred to below as aqueous dispersion of the invention. Preferred embodiments of the aqueous dispersion of the invention are apparent from the description which follows and also from the dependent claims.

The above-described polymer is a so-called seed-core-shell polymer and is also referred to as seed-core-shell acrylate in the present application.

Likewise provided by the present invention is a pigmented aqueous basecoat material comprising the aqueous dispersion of the invention as binder, and also the use of the aqueous dispersion of the invention in aqueous basecoat materials for improving adhesion. The present invention relates not least to a process for producing a multicoat paint system on a substrate, and also to a multicoat paint system produced by the stated process. The present invention relates to a method for repairing defect sites in multicoat paint systems, using the basecoat material of the invention.

The term "comprising" in the sense of the present invention, in connection with the aqueous dispersion of the invention, has in one preferred embodiment the meaning of "consisting of". The term "comprising" in the sense of the present invention, in connection with the aqueous basecoat material, has in one preferred embodiment the meaning of "consisting of". With regard to the aqueous basecoat materials of the invention in this preferred embodiment, one or more of the components identified later on below and present optionally in the aqueous basecoat material of the invention may be present in the aqueous basecoat material. All components may each be present in their below-stated preferred embodiments in the aqueous basecoat material of the invention.

With regard to the aqueous dispersions, a dispersion is named aqueous when it comprises a significant fraction of water. In this context, within the present invention "aqueous" is preferably to be understood to mean that the dispersion has a water fraction of at least 40 wt %, preferably at least 50 wt %, very preferably at least 60 wt %, based in each case on the total amount of the solvents present (that is, water and organic solvents). With particular preference the water fraction is 40 to 99 wt %, more particularly 50 to 98 wt %, very preferably 60 to 95 wt %, based in each case on the total amount of the solvents present.

The term "(meth)acrylate" is intended below to denote both acrylate and methacrylate.

For standards, as for example DIN standards, for which no version or no year of issue is explicitly stated, the valid version is that which was valid on the filing date or, if there was no valid version in existence on the filing date, then the last valid version of the standard.

The Aqueous Dispersion

The aqueous dispersions of the invention are prepared by multistage radical emulsion polymerization of olefinically unsaturated monomers in water.

The radical emulsion polymerization requires at least one polymerization initiator. The polymerization initiator used must be a water-soluble initiator. Preference is given to using an initiator selected from the list of potassium, sodium, or ammonium peroxodisulfate, hydrogen peroxide, tert-butyl hydroperoxide, 2,2'-azobis(2-amidoisopropane) dihydrochloride, 2,2'-azo-bis(N,N'-dimethylene-isobutyramidine) dihydrochloride, 2,2'-azobis(4-cyanopentanoic acid), or mixtures of the aforementioned initiators, e.g., hydrogen peroxide and sodium persulfate, and to redox initiator systems.

DETAILED DESCRIPTION

For all stages i), ii), and iii) of the emulsion polymerizations, at least one polymerization initiator is required in each case. The at least one polymerization initiator in each of stages i), ii) and iii) of the emulsion polymerization is selected independently of the polymerization initiators of the other stages. With preference the same polymerization initiator is used in each of stages i), ii) and iii) of the emulsion polymerization.

Redox initiator systems are those initiators which comprise at least one peroxide-containing compound in combination with a redox coinitiator, examples being sulfur compounds with a reductive activity, as for example bisulfites, sulfites, thiosulfates, dithionites, or tetrathionates of alkali metals and ammonium compounds, sodium hydroxymethanesulfinate dihydrate and/or thiourea. Accordingly, combinations of peroxodisulfates with alkali metal or ammonium hydrogensulfites can be used, e.g., ammonium peroxodisulfate and ammonium disulfite. The weight ratio of peroxide-containing compounds to the redox coinitiators is preferably 50:1 to 0.05:1. In combination with the initiators or with the redox initiator systems, it is possible additionally to employ transition metal catalysts, such as iron, nickel, cobalt, manganese, copper, vanadium, or chromium salts, for example, such as iron(II) sulfate, cobalt(II) chloride, nickel(II) sulfate, copper(I) chloride, manganese(II) acetate, vanadium(III) acetate, and manganese(II) chloride. Relative to the monomers, these transition metal salts are used customarily in amounts of 0.1 to 1000 ppm. Accordingly, combinations of hydrogen peroxide with iron(II) salts can be used, such as 0.5 to 30% hydrogen peroxide and 0.1 to 500 ppm Mohr's salt, for example.

The initiators are used preferably in an amount of 0.05 to 20 wt %, preferably 0.05 to 10, more preferably of 0.1 to 5 wt %, based on the total weight of the monomers used in the respective stage.

The polymerization is carried out usefully at a temperature of 0 to 160° C., preferably of 60 to 95° C.

It is preferred here to operate in the absence of oxygen, preferably under an inert gas atmosphere. Generally speaking, the polymerization is carried out under atmospheric pressure, although the use of lower pressures or higher pressures is also possible, especially if polymerization temperatures are employed which lie above the boiling point of the monomers and/or solvents.

Individual stages of the multistage emulsion polymerization for producing the aqueous dispersions of the invention must be carried out as a so-called "starved feed" polymerization (also known as "starve feed" or "starve fed" polymerization).

Starved feed polymerization in the sense of the present invention is considered an emulsion polymerization wherein the amount of residual monomers in the reaction solution is minimized throughout the reaction period—that is, the metered addition of the olefinically unsaturated monomers takes place in such a way that a concentration of 6.0 wt %, preferably 5.0 wt %, more preferably 4.0 wt %, very advantageously 3.5 wt %, in the reaction solution is not exceeded throughout the reaction period. Even more preferred are concentration ranges for the olefinically unsaturated monomers of 0.01 to 6.0 wt %, preferably 0.02 to 5.0 wt %, and more preferably 0.03 to 4.0 wt %, more particularly 0.05 to 3.5 wt %. For example, the highest fraction (or the concentration) detectable during the reaction may be 0.5 wt %, 1.0 wt %, 1.5 wt %, 2.0 wt %, 2.5 wt %, or 3.0 wt %, while all other detected values then lie below the values specified here.

The concentration of the monomers in the reaction solution may be determined here, for example, by gas chromatography:
after sampling, the sample is immediately cooled with liquid nitrogen and admixed with 4-methoxyphenol as inhibitor. In the next step, the sample is dissolved in tetrahydrofuran and n-pentane is added. The clear supernatant is analyzed by gas chromatography, using a polar column and an apolar column for determining the monomers, and a flame ionization detector. Typical parameters for the gas-chromatographic determination are as follows: 25 m silica capillary column with 5% phenyl-, 1% vinyl-methylpolysiloxane phase, or 30 m silica capillary column with 50% phenyl- and 50% methyl-polysiloxane phase, hydrogen carrier gas, 150° C. split injector, oven temperature 50 to 180° C., flame ionization detector, detector temperature 275° C., internal standard isobutyl acrylate.

For the purposes of the present invention, the monomer concentration is determined preferably by gas chromatography, more particularly with compliance with the parameters stated above.

The concentration of the monomers in the reaction solution, referred to below as free monomers, may be controlled in a variety of ways.

One possibility for minimizing the concentration of the free monomers is to select a very low metering rate for the mixture of olefinically unsaturated monomers. If the metering rate is low enough to allow all of the monomers to react extremely quickly as soon as they are in the reaction solution, it is possible to ensure that the concentration of the free monomers is minimized.

In addition to the metering rate, it is important that the reaction solution always contains sufficient radicals to allow the monomers metered in to be reacted extremely quickly, hence guaranteeing further chain growth and minimizing the concentration of free monomer.

For this purpose, the reaction conditions should preferably be selected such that initiator feed is commenced even before the start of the metering of the olefinically unsaturated monomers.

The metered addition is preferably commenced at least 5 minutes before, more preferably at least 10 minutes before. With preference at least 10 wt % of the initiator, more preferably at least 20 wt %, very preferably at least 30 wt % of the initiator, based in each case on the total amount of initiator, is added before the start of the metering of the olefinically unsaturated monomers.

The temperature selected should be one which allows constant decomposition of the initiator.

The amount of initiator is an important factor for the sufficient presence of radicals in the reaction solution. The amount of initiator should be selected such that sufficient radicals are available at any time, allowing the monomers metered in to react. If the amount of initiator is increased, it is also possible for larger amounts of monomers to be reacted at the same time.

Another factor determining the reaction rate is the reactivity of the monomers.

Controlling the concentration of the free monomers can therefore be accomplished by the interplay of initiator amount, rate of initiator addition, rate of monomer addition, and selection of the monomers. Not only the slowing of metering, but also the raising of initiator amount, and also the early commencement of initiator addition, serve the aim of keeping the concentration of the free monomers within the limits stated above.

At any juncture in the reaction, the concentration of the free monomers can be determined by gas chromatography, as described above.

Should this analysis find a concentration of free monomers which is close to the limit value for the starved feed polymerization, on account of olefinically unsaturated monomers having a very low reactivity, for example, the parameters stated above may be utilized for the control of the reaction. In this case, for example, the monomer metering rate can be reduced, or the amount of initiator can be increased.

Via the controlled conditions of starved feed polymerization, precise control is possible over the morphology and particle size of the resulting polymer, by the metered addition of the monomers being stopped when particle size has been achieved.

In this context, a sample of the reaction solution can be taken at any time, and the particle size determined by means of dynamic light scattering in accordance with DIN ISO 13321.

All stages i), ii), and iii) of the emulsion polymerization require in each case at least one emulsifier. The at least one emulsifier in each of stages i), ii), and iii) of the emulsion polymerization is selected independently of the emulsifiers of the other stages. With preference the same emulsifier is used in each of stages i), ii), and iii) of the emulsion polymerization.

The emulsifiers are used preferably in an amount of 0.1-10.0 wt %, more preferably 0.1-5.0 wt %, very preferably 0.1-3.0 wt %, based in each case on the total weight of the monomers in the respective stage.

Nonionic or ionic emulsifiers, and zwitterionic emulsifiers as well, and also, optionally, mixtures of the aforementioned emulsifiers, can be used.

Preferred emulsifiers are optionally ethoxylated or propoxylated alkanols having 10 to 40 carbon atoms and having different degrees of ethoxylation and/or propoxylation (e.g., adducts with 0 to 50 mol of alkylene oxide), and/or their neutralized, sulfated, sulfonated or phosphated derivatives.

Particularly preferred emulsifiers are neutralized dialkylsulfosuccinic esters or alkyldiphenyl oxide disulfonates, available commercially for example as EF-800 from Cytec.

For the purposes of the invention, the glass transition temperature Tg is determined experimentally on the basis of DIN 51005 "Thermal analysis (TA)—terms" and DIN 53765 "Thermal analysis—differential scanning calorimetry (DSC)". This involves weighing out a 10 mg sample into a sample boat and introducing it into a DSC instrument. The instrument is cooled to the start temperature, after which $1^{st}$ and $2^{nd}$ measurement runs are carried out under inert gas flushing (N2) at 50 ml/min, with a heating rate of 10 K/min, with cooling to the start temperature again between the measurement runs. Measurement takes place customarily in the temperature range from about 50° C. lower than the expected glass transition temperature to about 50° C. higher than the glass transition temperature. The glass transition temperature for the purposes of the present invention, in accordance with DIN 53765, section 8.1, is the temperature in the $2^{nd}$ measurement run at which half of the change in the specific heat capacity (0.5 delta cp) is reached. This temperature is determined from the DSC diagram (plot of the thermal flow against the temperature), and is the temperature at the point of intersection of the midline between the extrapolated baselines, before and after the glass transition, with the measurement plot.

All of the values reported below for glass transition temperatures Tg relate to the particular polymer which is formed when the respective monomer mixture is polymerized individually. The value obtained for the third stage, for example, is therefore the value obtained when the monomer mixture of the third stage is polymerized in the absence of the first and second stages.

For a purposive estimation of the anticipated glass transition temperatures, the equation known as the Fox equation can be used:
Fox equation:

$$\frac{1}{T_g} = \frac{x_1}{T_{g1}} + \frac{x_2}{T_{g2}} + \ldots + \frac{x_n}{T_{gn}}$$

$T_g$: glass transition temperature of the resulting copolymer (kelvins)
$x_1, x_2, \ldots, x_n$: Weight portion of the monomer component 1, 2, \ldots, n
$T_{g1}, T_{g2}, \ldots, T_{gm}$: glass transition temperature of the homopolymer of the monomer component 1, 2, \ldots, n (kelvins).

Since the Fox equation represents only an approximation, based on the glass transition temperatures of the homopolymers and their weight portions, without including a molecular weight, it can be used only as a tool or a purposive indicator to the skilled person in the synthesis.

The only glass transition temperature values relevant for the description of the present invention are those measured as described above.

All of the acid numbers and hydroxyl numbers reported below are values calculated on the basis of the monomer compositions.

Suitable olefinically unsaturated monomers may be mono- or polyolefinically unsaturated.

Examples of suitable monoolefinically unsaturated monomers include (meth)acrylate-based monoolefinically unsaturated monomers, vinylic monoolefinically unsaturated monomers, alpha-beta unsaturated carboxylic acids, and allyl compounds.

The (meth)acrylate-based monoolefinically unsaturated monomers may be, for example, (meth)acrylic acid and esters, nitriles, or amides of (meth)acrylic acid.

Preference is given to esters of (meth)acrylic acid having a radical R which is not olefinically unsaturated.

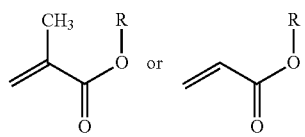

The radical R may be aliphatic or aromatic. The radical R is preferably aliphatic. The radical R may be, for example, an alkyl radical, or may contain heteroatoms.

Examples of radicals R which contain heteroatoms are ethers. Preference is given to using at least, but not necessarily exclusively, monomers in which the radical R is an alkyl radical.

If R is an alkyl radical, it may be a linear, branched, or cyclic alkyl radical. In all three cases, the radicals in question may be unsubstituted or else substituted by functional groups. The alkyl radical preferably has 1 to 20, more preferably 1 to 10, carbon atoms.

Monounsaturated esters of (meth)acrylic acid with an unsubstituted alkyl radical that are suitable with particular preference are methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, amyl (meth)acrylate, hexyl (meth)acrylate, ethylhexyl (meth)acrylate, 3,3,5-trimethylhexyl (meth)acrylate, stearyl (meth)acrylate, lauryl (meth)acrylate, cycloalkyl (meth)acrylates, such as cyclopentyl (meth)acrylate, isobornyl (meth)acrylate, and also cyclohexyl (meth)acrylate, with n- and tert-butyl (meth)acrylate and methyl methacrylate being especially preferred.

Suitable monounsaturated esters of (meth)acrylic acid with a substituted alkyl radical may be substituted preferably by one or more hydroxyl groups or by phosphoric ester groups.

Monounsaturated esters of (meth)acrylic acid with an alkyl radical substituted by one or more hydroxyl groups, suitable with particular preference, are 2-hydroxyethyl (meth) acrylate, 2-hydroxypropyl (meth)acrylate, 3-hydroxybutyl (meth)acrylate, 3-hydroxybutyl (meth)acrylate and 4-hydroxybutyl (meth)acrylate, with 2-hydroxyethyl (meth)acrylate being especially preferred.

Monounsaturated esters of (meth)acrylic acid with phosphoric ester groups, of particularly preferred suitability, are, for example, the phosphoric ester of polypropylene glycol monomethacrylate, such as the commercially available Sipomer PAM 200 from Rhodia.

The vinylic monounsaturated monomers may be monomers having a radical R' on the vinyl group that is not olefinically unsaturated.

The radical R' may be aliphatic or aromatic, with aromatic radicals being preferred.

The radical R' may be a hydrocarbon radical or may contain heteroatoms. Examples of radicals R' which contain heteroatoms are ethers, esters, amides, nitriles, and heterocycles. The radical R' is preferably a hydrocarbon radical. Where R' is a hydrocarbon radical, it may be unsubstituted or substituted by heteroatoms, with unsubstituted radicals being preferred. The radical R' is preferably an aromatic hydrocarbon radical.

Particularly preferred vinylic olefinically unsaturated monomers are vinylaromatic hydrocarbons, especially vinyltoluene, alpha-methylstyrene, and especially styrene.

If heteroatoms are included, olefinically unsaturated monomers are preferred, such as acrylonitrile, methacrylonitrile, acrylamide, methacrylamide, N-dimethylacrylamide, vinyl acetate, vinyl propionate, vinyl chloride, N-vinylpyrrolidone, N-vinylcaprolactam, N-vinylformamide, N-vinylimidazole, and N-vinyl-2-methylimidazoline.

The radical R' may preferably have the following structure:

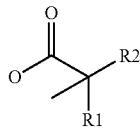

In this structure, the radicals R1 and R2 are alkyl radicals having a total of 7 carbon atoms. Monomers of this kind are available commercially under the name VEOVA 10 from Momentive.

Examples of suitable polyolefinically unsaturated monomers encompass esters of (meth)acrylic acid with an olefinically unsaturated radical R", and allyl ethers of mono- or polyhydric alcohols. The radical R" may be an allyl radical or a (meth)acryloyl radical.

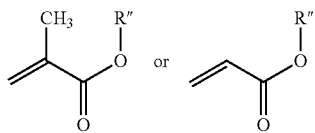

Preferred polyolefinically unsaturated monomers include ethylene glycol di(meth)acrylate, 1,2-propylene glycol di(meth)acrylate, 2,2-propylene glycol di(meth)acrylate, butane-1,4-diol di(meth)acrylate, neopentyl glycol di(meth)acrylate, 3-methylpentanediol di(meth)acrylate, diethylene glycol di(meth)acrylate, triethylene glycol di(meth)acrylate, tetraethylene glycol di(meth)acrylate, dipropylene glycol di(meth)acrylate, tripropylene glycol di(meth)acrylate, hexanediol di(meth)acrylate, and allyl (meth)acrylate.

Preferred polyolefinically unsaturated compounds additionally include acrylic and methacrylic esters of alcohols having more than two OH groups, such as, for example, trimethylolpropane tri(meth)acrylate or glycerol tri(meth)acrylate, but also trimethylolpropane di(meth)acrylate monoallyl ether, trimethylolpropane (meth)acrylate diallyl ether, pentaerythritol tri(meth)acrylate monoallyl ether, pentaerythritol di(meth)acrylate diallyl ether, pentaerythritol (meth)acrylate triallyl ether, triallylsucrose, and pentaallylsucrose.

Particular preference is given to using hexanediol di(meth)acrylate and/or allyl methacrylate, very preferably a combination of hexanediol di(meth)acrylate and allyl methacrylate.

The solubility of the organic monomers in water can be determined via establishment of equilibrium with the gas space above the aqueous phase (in analogy to the reference X.-S. Chai, Q. X. Hou, F. J. Schork, Journal of Applied Polymer Science vol. 99, 1296-1301 (2006)).

For this purpose, in a 20 ml gas space sample tube, to a defined volume of water, preferably 2 ml, an excess in relation to the solubility of the monomer to be determined, and an addition of 10 ppm of an emulsifier are added. In order to obtain the equilibrium concentration, the mixture is shaken continually. The supernatant gas phase is replaced by an inert gas, thus re-establishing an equilibrium. In the gas phase removed, the fraction of the substance to be detected is measured (preferably by means of gas chromatography). The equilibrium concentration in water can be determined by plotting the fraction of the monomer in the gas phase as a graph. The slope of the curve changes from a virtually constant value (S1) to a significantly negative slope (S2) as soon as the excess monomer fraction has been removed from the mixture. The equilibrium concentration here is reached at the point of intersection of the straight line with the slope S1 and of the straight line with the slope S2.

The determination described is carried out preferably at 25° C.

Stage i. of preparing the aqueous dispersions of the invention is the reaction of a mixture of olefinically unsaturated monomers A by emulsion polymerization in water, using at least one emulsifier and at least one water-soluble initiator, with the mixture of olefinically unsaturated monomers A being metered in such that the monomers concentration in the reaction solution does not exceed 6.0 wt %, preferably 5.0 wt %, more preferably 4.0 wt % throughout the reaction period, in other words such as to observe the reaction conditions for a starved feed polymerization.

The resulting polymer from stage i. is referred to below as seed.

The total mass of the monomer mixture A here preferably has a fraction of 1.0 to 10.0%, more preferably 2.0 to 6.0%, based on the total mass of the monomer mixtures A, B, and C.

The mixture of olefinically unsaturated monomers A here is selected such that the resulting polymer has a glass transition temperature Tg of 10 to 55° C., preferably of 30 to 50° C.

The mixture of olefinically unsaturated monomers A comprises from 0 wt %, preferably from 10 wt %, more preferably from 25 wt %, and very preferably from 35 wt % to less than 50.0 wt %, preferably less than 49.0 wt %, more preferably less than 48.0 wt %, and very preferably less than 45.0 wt %, based on the total mass of the mixture of olefinically unsaturated monomers A, of one or more monomers having a solubility in water at a temperature of 25° C. of <0.5 g/l.

The monomers having a solubility in water at a temperature of 25° C. of <0.5 g/l preferably comprise styrene.

The reaction conditions for the polymerization are selected such that the resulting polymer after stage i. has a particle size of 20 to 110 nm.

The monomer mixture A preferably contains no hydroxy-functional monomers.

The monomer mixture A preferably contains no acid-functional monomers.

The monomer mixture A more preferably comprises at least one monounsaturated ester of (meth)acrylic acid having an unsubstituted alkyl radical, and/or at least one vinylically monounsaturated monomer having an aromatic radical on the vinyl group. The monounsaturated ester of the (meth)acrylic acid having an unsubstituted alkyl radical is preferably n-butyl acrylate or ethyl acrylate. The vinylically mono-unsaturated monomer having an aromatic radical on the vinyl group is preferably styrene.

Stage ii. of preparing the aqueous dispersions of the invention is the reaction of a mixture of olefinically unsaturated monomers B by emulsion polymerization in water, using at least one emulsifier and at least one water-soluble initiator, in the presence of the polymer obtained under i., the seed, with the mixture of olefinically unsaturated monomers B being metered in such that a monomers concentration of 6.0 wt %, preferably 5.0 wt %, more preferably 4.0 wt % in the reaction solution is not exceeded throughout the reaction period, thereby observing the reaction conditions for a starved feed polymerization.

The polymer resulting from the mixture of olefinically unsaturated monomers B is referred to below as core. The overall outcome, in other words the resulting polymer after stage (iii.), is therefore a combination of seed and core.

The total mass of the monomer mixture B here preferably has a fraction of 60 to 80%, more preferably 70 to 80%, very preferably of 71 to 77%, based on the total mass of the monomer mixtures A, B, and C.

The mixture of olefinically unsaturated monomers B here is selected such that a polymer prepared from the monomers B has a glass transition temperature Tg of −35 to +12° C., preferably of −25 to +7° C.

The reaction conditions for the polymerization are selected such that the resulting polymer after stage ii., i.e., seed and core, has a particle size of 130 to 200 nm.

The monomer mixture B comprises at least one polyolefinically unsaturated monomer.

The monomer mixture B preferably contains no acid-functional monomers.

The monomer mixture B preferably contains no hydroxy-functional monomers.

The monomer mixture B preferably comprises at least one polyolefinically unsaturated monomer and at least one monounsaturated ester of (meth)acrylic acid having an unsubstituted alkyl radical. In one especially preferred embodiment the monomer mixture B additionally comprises at least one vinylically monounsaturated monomer having an aromatic radical on the vinyl group.

Stage iii. of preparing the aqueous dispersions of the invention is the reaction of a mixture of olefinically unsaturated monomers C by emulsion polymerization in water, using at least one emulsifier and at least one water-soluble initiator, in the presence of the polymer obtained under ii., consisting of seed and core, with the mixture of olefinically unsaturated monomers C being metered in such that a monomers concentration of 6.0 wt %, preferably 5.0 wt %, more preferably 4.0 wt % in the reaction solution is not exceeded throughout the reaction period, thereby observing the reaction conditions for a starved feed polymerization.

The polymer resulting from the mixture of olefinically unsaturated monomers C is referred to below as shell. The overall outcome, in other words the resulting polymer after stage (iii.), is therefore a combination of seed, core, and shell. The overall multistage polymer is also identified as a seed-core-shell polymer.

The total mass of the monomer mixture C here has a fraction of preferably 10 to 30%, more preferably of 18 to 24%, based on the total mass of the monomer mixtures A, B, and C.

The mixture of olefinically unsaturated monomers C is selected here such that a polymer prepared from the monomers C has a glass transition temperature Tg of −50 to 15° C., preferably of −20 to +12° C.

The mixture of olefinically unsaturated monomers C is preferably selected here such that the resulting polymer, consisting of seed, core, and shell, has an acid number of 10 to 25.

Preferably the monomers for the mixture of olefinically unsaturated monomers C are selected here such that the resulting polymer, consisting of seed, core, and shell, has an OH number of 0 to 30, more preferably of 10 to 25.

The reaction conditions for the polymerization are selected such that the resulting polymer after stage iii. has a particle size of 150 to 280 nm.

The monomer mixture C preferably comprises at least one alpha-beta unsaturated carboxylic acid.

In one particularly preferred embodiment the monomer mixture C comprises at least one alpha-beta unsaturated carboxylic acid and at least one monounsaturated ester of (meth)acrylic acid having an alkyl radical substituted by one or more hydroxyl groups.

In one especially preferred embodiment the monomer mixture C comprises at least one alpha-beta unsaturated carboxylic acid, at least one monounsaturated ester of (meth)acrylic acid having an alkyl radical substituted by one or more hydroxyl groups and at least one monounsaturated ester of (meth)acrylic acid having an unsubstituted alkyl radical.

In one preferred embodiment the mass of the monomer mixture A, based on the total mass of the monomer mixtures A, B, and C, is 1 to 10%, the mass of the monomer mixture B, based on the total mass of the monomer mixtures A, B, and C, is 60 to 80%, and the mass of the monomer mixture C, based on the total mass of the monomer mixtures A, B, and C, is 10 to 30%.

In one particularly preferred embodiment the mass of the monomer mixture A, based on the total mass of the monomer mixtures A, B, and C, is 2 to 6%, the mass of the monomer mixture B, based on the total mass of the monomer mixtures A, B, and C, is 71 to 77%, and the mass of the monomer mixture C, based on the total mass of the monomer mixtures A, B, and C, is 18 to 24%.

Stage iv. of preparing the aqueous polymer dispersions of the invention is the neutralization of the reaction solution. By neutralization is meant adjustment to a pH of 6.5 to 9.0 by addition of a base, preferably by addition of an amine. Employed with particular preference for the neutralization is N,N-dimethyl-ethanolamine (DMEA).

The measurement of the pH here is carried out preferably using a pH meter (for example, Mettler-Toledo S20 SevenEasy pH Meter) having a combined pH electrode (for example, Mettler-Toledo InLab® Routine).

The polymers after neutralization preferably have a particle size (z-average) of 100 to 400, more preferably of 220 to 330 nm.

The OH number of the polymers is preferably between 0 and 200 mg/g KOH.

The solids content, or solids, refers to the weight fraction remaining as a residue on evaporation under specified conditions. The solids content of the aqueous dispersion of the invention is determined in accordance with DIN EN ISO 3251 at 125° C., 60 minutes, initial mass 1.0 g (table A.2, Method C of DIN EN ISO 3251).

The gel fraction of the aqueous dispersion of the invention is preferably at least 70 wt %, more preferably at least 80 wt %, based in each case on the solids content of the dispersion.

Gel fraction can be determined gravimetrically by centrifuging the dispersion. This is done by diluting the dispersion with tetrahydrofuran and using an ultracentrifuge to remove the insoluble fraction. The dried insoluble fraction is subsequently weighed, and the ratio is formed with the total solids content of the dispersion. The value obtained corresponds to the gel fraction.

The Pigmented Aqueous Basecoat Material

The present invention further relates to a pigmented aqueous basecoat material which comprises at least one aqueous dispersion of the invention.

A basecoat material is an intermediate, color-imparting coating material which is used in automotive finishing and general industrial coating. It is generally applied to a metallic or plastic substrate that has been pretreated with surfacer or with primer-surfacer, or else occasionally directly to the plastics substrate. Serving as substrates may also be existing paint systems, which optionally must also be pretreated (by being abraded, for example). In order to protect a basecoat film against environmental influences in particular, at least an additional clearcoat film is applied over it.

The weight percentage fraction of the at least one aqueous dispersion of the invention, based on the total weight of the aqueous basecoat material, is preferably 5.0 to 60.0 wt %, more preferably 10.0 to 50.0 wt %, and very preferably 20.0 to 45.0 wt %.

The weight percentage fraction of the polymers originating from the aqueous dispersions of the invention, based on the total weight of the aqueous basecoat material, is preferably 1.0 to 24.0 wt %, preferably 2.5 to 20.0 wt %, and more preferably 3.0 to 18.0 wt %.

In the case of a possible particularization to basecoat materials comprising preferred components in a specific fractional range, the following applies: the components which do not fall within the preferred group may of course still be present in the basecoat material. The specific fractional range then applies only to the preferred group of components. For the total fraction of components, however, consisting of components from the preferred group and components which do not fall within the preferred group, the specific fractional range likewise preferably applies.

If, therefore, there were to be restriction to a fractional range of 1.5 to 15 wt % and to a preferred group of components, then this fractional range evidently applies initially only to the preferred group of components. In that case, however, it would be preferable for there to be likewise from 1.5 to 15 wt % present overall of all originally encompassed components, consisting of components from the preferred group and components not falling within the preferred group. If, therefore, 5 wt % of components of the preferred group are employed, then not more than 10 wt % of the components of the non-preferred group can be used.

In the context of the present invention, the stated principle applies to all stated components of the basecoat material and to their fractional ranges, as for example the aqueous dispersions of the invention, pigments, the polyurethane resins as binders, or else the crosslinking agents such as melamine resins.

The aqueous basecoat material generally comprises coloring pigments and/or optical-effect pigments.

Such color pigments and effect pigments are known to the skilled person and are described in, for example, Rompp-Lexikon Lacke and Druckfarben, Georg Thieme Verlag, Stuttgart, N.Y., 1998, pages 176 and 451.

Effect pigments are, for example, metallic effect pigments such as aluminum pigments, gold bronzes, oxidized bronzes and/or iron oxide-aluminum pigments, pearlescent pigments such as, for example, pearl essence, basic lead carbonate, bismuth oxide chloride and/or metal oxide-mica pigments and/or other effect pigments such as micronized titanium dioxide, lamellar graphite, lamellar iron oxide, multilayer effect pigments formed from PVD films, and/or liquid crystal polymer pigments.

The fraction of the pigments may be for example in the range from 1 to 40 wt %, preferably 2 to 20 wt %, more preferably 5 to 15 wt %, based on the total weight of the pigmented aqueous basecoat material.

Basecoat material of the invention may comprise binders curable physically, thermally, or both thermally and with actinic radiation.

In the context of the present invention, the term "physical curing" means the formation of a film through loss of solvent from polymer solutions or polymer dispersions. Typically, no crosslinking agents are necessary for this curing.

In the context of the present invention, the term "thermal curing" means the heat-initiated crosslinking of a coating film, with either a separate crosslinking agent or else self-crosslinking binders being employed in the parent coating material. The crosslinking agent contains reactive functional groups which are complementary to the reactive functional groups present in the binders. This is commonly referred to by those in the art as external crosslinking. Where the complementary reactive functional groups or autoreactive functional groups—that is, groups which react with groups of the same kind—are already present in the binder molecules, the binders present are self-crosslinking. Examples of suitable complementary reactive functional groups and autoreactive functional groups are known from German patent application DE 199 30 665 A1, page 7, line 28 to page 9, line 24.

For the purposes of the present invention, actinic radiation means electromagnetic radiation such as near infrared (NIR), UV radiation, more particularly UV radiation, and particulate radiation such as electron radiation. Curing by UV radiation is commonly initiated by radical or cationic photoinitiators.

Where thermal curing and curing with actinic light are employed in unison, the term "dual cure" is also used.

In the present invention preference is given to basecoat materials which are curable thermally or both thermally and with actinic radiation, i.e., by "dual cure".

Especially preferred basecoat materials are those which comprise as binder a polyacrylate resin and as crosslinking agent an aminoplast resin or a blocked or nonblocked polyisocyanate, preferably an aminoplast resin. Among the aminoplast resins, melamine resins are especially preferred.

As well as the aqueous dispersion of the invention basecoat materials of the invention preferably comprise a further binder, preferably a polyurethane resin.

The polyurethane resin preferably present may be ionically and/or nonionically hydrophilically stabilized. In preferred embodiments of the present invention the polyurethane resin is ionically hydrophilically stabilized. The preferred polyurethane resins are linear or contain instances of branching. The polyurethane resin is more preferably one in whose presence olefinically unsaturated monomers have been polymerized. This polyurethane resin may be present alongside the polymer originating from the polymerization of the olefinically unsaturated monomers, without these polymers being bonded covalently to one another. Equally, however, the polyurethane resin may also be bonded covalently to the polymer originating from the polymerization of the olefinically unsaturated monomers. The olefinically unsaturated monomers are preferably monomers containing acrylate groups and/or methacrylate groups. It is likewise preferred for the monomers containing acrylate and/or methacrylate groups to be used in combination with other olefinically unsaturated compounds which contain no acrylate or methacrylate groups. Olefinically unsaturated monomers attached to the polyurethane resin are more preferably monomers containing acrylate groups or methacrylate groups, thereby producing polyurethane (meth)acrylates. Very preferably the polyurethane resin is a polyurethane (meth)acrylate. The polyurethane resin present with preference is curable physically, thermally, or both thermally and with actinic radiation. More particularly it is curable either thermally or both thermally and with actinic radiation. With particular preference the polyurethane resin comprises reactive functional groups through which external crosslinking is possible.

Suitable saturated or unsaturated polyurethane resins are described, for example, in German patent application DE 199 14 896 A1, column 1, lines 29 to 49 and column 4, line 23 to column 11, line 5, German patent application DE 199 48 004 A1, page 4, line 19 to page 13, line 48, European patent application EP 0 228 003 A1, page 3, line 24 to page 5, line 40, European patent application EP 0 634 431 A1, page 3, line 38 to page 8, line 9, or international patent application WO 92/15405, page 2, line 35 to page 10, line 32, German patent application DE 4437535 A1, page 7, line 55 to page 8, line 23, international patent application WO 91/15528, page 23, line 29 to page 24, line 24.

The polyurethane resin is prepared using preferably the aliphatic, cycloaliphatic, aliphatic-cycloaliphatic, aromatic, aliphatic-aromatic and/or cycloaliphatic-aromatic polyisocyanates that are known to the skilled person.

As alcohol component for preparing the polyurethane resins, preference is given to using the saturated and unsaturated polyols of relatively high molecular mass and of low molecular mass, and also, optionally, monoalcohols, in minor amounts, that are known to the skilled person. Low molecular mass polyols used are more particularly diols and, in minor amounts, triols, for introducing instances of branching. Examples of suitable polyols of relatively high molecular mass are saturated or olefinically unsaturated polyester polyols and/or polyether polyols. Relatively high molecular mass polyols used are more particularly polyester polyols, especially those having a number-average molecular weight of 400 to 5000 g/mol.

For hydrophilic stabilization and/or for increasing the dispersibility in aqueous medium, the polyurethane resin preferably present may contain particular ionic groups and/or groups which can be converted to ionic groups (potentially ionic groups). Polyurethane resins of this kind are referred to in the context of the present invention as ionically hydrophilically stabilized polyurethane resins. Likewise present may be nonionic hydrophilically modifying groups. Preferred, however, are the ionically hydrophilically stabilized polyurethanes. In more precise terms, the modifying groups are alternatively functional groups which can be converted to cations by neutralizing agents and/or quaternizing agents, and/or cationic groups (cationic modification) or functional groups which can be converted to anions by neutralizing agents, and/or anionic groups (anionic modification) and/or nonionic hydrophilic groups (nonionic modification).

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted to cationic groups by neutralizing agents and/or quaternizing agents). Mention should also be made of the cationic groups—groups prepared from the aforementioned functional groups using neutralizing agents and/or quaternizing agents known to those skilled in the art—such as primary, secondary, tertiary and/or quaternary ammonium groups, tertiary sulfonium groups and/or quaternary phosphonium groups, more particularly quaternary ammonium groups and tertiary sulfonium groups.

As is well known, the functional groups for anionic modification are, for example, carboxylic acid, sulfonic acid and/or phosphonic acid groups, more particularly carboxylic acid groups (functional groups which can be converted to anionic groups by neutralizing agents), and also anionic groups—groups prepared from the aforementioned functional groups using neutralizing agents known to the skilled person—such as carboxylate, sulfonate and/or phosphonate groups.

The functional groups for nonionic hydrophilic modification are preferably poly(oxyalkylene) groups, more particularly poly(oxyethylene) groups.

The ionically hydrophilic modifications can be introduced into the polyurethane resin through monomers which contain the (potentially) ionic groups. The nonionic modifications are introduced, for example, through the incorporation of poly(ethylene) oxide polymers as lateral or terminal groups in the polyurethane molecules. The hydrophilic modifications are introduced, for example, via compounds which contain at least one group reactive toward isocyanate groups, preferably at least one hydroxyl group. The ionic modification can be introduced using monomers which, as well as the modifying groups, contain at least one hydroxyl group. To introduce the nonionic modifications, preference is given to using the polyether diols and/or alkoxypoly (oxyalkylene) alcohols known to those skilled in the art.

The polyurethane resin may preferably be a graft polymer. More particularly it is a polyurethane resin grafted with olefinically unsaturated compounds, preferably olefinically unsaturated monomers. In this case, then, the polyurethane is grafted, for example, with side groups and/or side chains that are based on olefinically unsaturated monomers. These are more particularly side chains based on poly(meth)acrylates. Poly(meth)acrylates for the purposes of the present invention are polymers or polymeric radicals which comprise monomers containing acrylate and/or methacrylate groups, and preferably consist of monomers containing acrylate groups and/or methacrylate groups. Side chains based on poly(meth)acrylates are understood to mean side chains which are constructed during the graft polymerization, using monomers containing (meth)acrylate groups. In the graft polymerization, preference here is given to using more than 50 mol %, more particularly more than 75 mol %, especially 100 mol %, based on the total amount of the monomers used in the graft polymerization, of monomers containing (meth)acrylate groups.

The side chains described are introduced into the polymer preferably after the preparation of a primary polyurethane resin dispersion. In this case the polyurethane resin present in the primary dispersion may contain lateral and/or terminal olefinically unsaturated groups via which, then, the graft polymerization with the olefinically unsaturated compounds proceeds. The polyurethane resin for grafting may therefore be an unsaturated polyurethane resin (A). The graft polymerization is in that case a radical polymerization of olefinically unsaturated reactants. Also possible, for example, is for the olefinically unsaturated compounds used for the graft polymerization to contain at least one hydroxyl group. In that case it is also possible first for there to be attachment of the olefinically unsaturated compounds via these hydroxyl groups through reaction with free isocyanate groups of the polyurethane resin. This attachment takes place instead of or in addition to the radical reaction of the olefinically unsaturated compounds with the lateral and/or terminal olefinically unsaturated groups optionally present in the polyurethane resin. This is then followed again by the graft polymerization via radical polymerization, as described earlier on above. The result in any case is polyurethane resins grafted with olefinically unsaturated compounds, preferably olefinically unsaturated monomers.

As olefinically unsaturated compounds with which the polyurethane resin (A) is preferably grafted it is possible to use virtually all radically polymerizable, olefinically unsaturated, and organic monomers which are available to the skilled person for these purposes. A number of preferred monomer classes may be specified by way of example:
- hydroxyalkyl esters of (meth)acrylic acid or of other alpha,beta-ethylenically unsaturated carboxylic acids,
- (meth)acrylic acid alkyl and/or cycloalkyl esters having up to 20 carbon atoms in the alkyl radical,
- ethylenically unsaturated monomers comprising at least one acid group, more particularly exactly one carboxyl group, such as (meth)acrylic acid, for example,
- vinyl esters of monocarboxylic acids which are branched in alpha-position and have 5 to 18 carbon atoms,
- reaction products of (meth)acrylic acid with the glycidyl ester of a monocarboxylic acid which is branched in alpha-position and has 5 to 18 carbon atoms,
- further ethylenically unsaturated monomers such as olefins (ethylene for example), (meth)acrylamides, vinylaromatic hydrocarbons (styrene for example), vinyl compounds such as vinyl chloride and/or vinyl ethers such as ethyl vinyl ether.

Used with preference are monomers containing (meth)acrylate groups, and so the side chains attached by grafting are poly(meth)acrylate-based side chains.

The lateral and/or terminal olefinically unsaturated groups in the polyurethane resin, via which the graft polymerization with the olefinically unsaturated compounds can proceed, are introduced into the polyurethane resin preferably via particular monomers. These particular monomers, in addition to an olefinically unsaturated group, also include, for example, at least one group that is reactive toward isocyanate groups. Preferred are hydroxyl groups and also primary and secondary amino groups. Especially preferred are hydroxyl groups.

The monomers described through which the lateral and/or terminal olefinically unsaturated groups may be introduced into the polyurethane resin may also, of course, be employed without the polyurethane resin being additionally grafted thereafter with olefinically unsaturated compounds. It is preferred, however, for the polyurethane resin to be grafted with olefinically unsaturated compounds.

The polyurethane resin preferably present may be a self-crosslinking and/or externally crosslinking binder. The polyurethane resin preferably comprises reactive functional groups through which external crosslinking is possible. In that case there is preferably at least one crosslinking agent in the pigmented aqueous basecoat material. The reactive functional groups through which external crosslinking is possible are more particularly hydroxyl groups. With particular advantage it is possible, for the purposes of the method of the invention, to use polyhydroxy-functional polyurethane resins. This means that the polyurethane resin contains on average more than one hydroxyl group per molecule.

The polyurethane resin is prepared by the customary methods of polymer chemistry. This means, for example, the polyaddition of polyisocyanates and polyols to polyurethanes, and the graft polymerization that preferably then follows with olefinically unsaturated compounds. These methods are known to the skilled person and can be adapted individually. Exemplary preparation processes and reaction conditions can be found in European patent EP 0521 928 B1, page 2, line 57 to page 8, line 16.

The polyurethane resin preferably present preferably possesses a number-average molecular weight of 200 to 30 000 g/mol, more preferably of 2000 to 20 000 g/mol. It further possesses, for example, a hydroxyl number of 0 to 250 mg KOH/g, but more particularly from 20 to 150 mg KOH/g. The acid number of the polyurethane resin is preferably 5 to 200 mg KOH/g, more particularly 10 to 40 mg KOH/g. For the purposes of the present invention, the hydroxyl number is determined to DIN 53240, and the acid number to DIN 53402.

The aqueous basecoat material of the invention may further comprise at least one polyester, more particularly a polyester having a number-average molecular weight of 400 to 5000 g/mol, as binder. Such polyesters are described for example in DE 4009858 in column 6, line 53 to column 7, line 61 and column 10, line 24 to column 13, line 3.

There is preferably also at least one thickener present. Suitable thickeners are inorganic thickeners from the group of the phyllosilicates. Particularly suitable are lithium aluminum magnesium silicates.

As well as the inorganic thickeners, however, it is also possible to use one or more organic thickeners. These are preferably selected from the group consisting of (meth)acrylic acid-(meth)acrylate copolymer thickeners, for example the commercial product Rheovis® AS 1130 (BASF SE), and of polyurethane thickeners, for example the commercial product Rheovis® PU 1250 from BASF SE. (Meth)acrylic acid-(meth)acrylate copolymer thickeners are those which as well as acrylic acid and/or methacrylic acid also contain in copolymerized form one or more acrylic esters (i.e., acrylates) and/or one or more methacrylic esters (i.e., methacrylates). A feature common to the (meth)acrylic acid-(meth)acrylate copolymer thickeners is that in an alkaline medium, in other words at pH levels>7, more particularly >7.5, by formation of a salt of the acrylic acid and/or methacrylic acid, in other words by the formation of carboxylate groups, they exhibit a strong increase in viscosity. If (meth)acrylic esters are used which are formed from (meth)acrylic acid and a $C_1$-$C_6$ alkanol, the products are essentially nonassociative (meth)acrylic acid-(meth)acrylate copolymer thickeners, such as the abovementioned Rheovis AS 1130, for example. Essentially nonassociative (meth)acrylic acid-(meth)acrylate copolymer thickeners are also referred to in the literature as ASE thickeners ("Alkali Soluble/Swellable Emulsion" or dispersion). Also possible for use as (meth)acrylic acid-(meth)acrylate copolymer thickeners, however, are those known as HASE thickeners ("Hydrophobically Modified Anionic Soluble Emulsions" or dispersion). These are obtained by using as alkanols, instead of or in addition to the $C_1$-$C_6$ alkanols, those having a larger number of carbon atoms, as for example 7 to 30, or 8 to 20 carbon atoms. HASE thickeners have an essentially associative thickening effect. On account of their thickening properties, the (meth)acrylic acid-(meth)acrylate copolymer thickeners which can be used are not suitable as binder resins, and hence do not come under the physically, thermally, or both thermally and actinically curable binders that are identified as binders, and they are therefore explicitly different from the poly(meth)acrylate-based binders which can be employed in the basecoat material compositions of the invention. Polyurethane thickeners are the associative thickeners that are identified in the literature as HEUR ("Hydrophobically Modified Ethylene Oxide Urethane Rheology Modifiers"). Chemically these are nonionic, branched or unbranched, block copolymers composed of polyethylene oxide chains (sometimes also polypropylene oxide chains) which are linked to one another via urethane bonds and which carry terminal long-chain alkyl or alkylene groups having 8 to 30 carbon atoms. Typical alkyl groups are, for example, dodecyl or stearyl groups; a typical alkenyl group is, for example, an oleyl group; a typical aryl group is the phenyl group; and a typical alkylated aryl group is, for example, a nonylphenyl group. On account of their thickening properties and structure, the polyurethane thickeners are not suitable as binder resins curable physically, thermally, or both thermally and physically. They are therefore explicitly different from the polyurethanes which can be used as binders in the basecoat material compositions of the invention.

Furthermore, the aqueous basecoat material may further comprise at least one adjuvant. Examples of such adjuvants are salts which can be decomposed thermally without residue or substantially without residue, resins as binders that are curable physically, thermally and/or with actinic radiation and are different from polyurethane resins, further crosslinking agents, organic solvents, reactive diluents, transparent pigments, filler, molecularly dispersely soluble dyes, nanoparticles, light stabilizers, antioxidants, deaerating agents, emulsifiers, slip additives, polymerization inhibitors, initiators of radical polymerizations, adhesion promoters, flow control agents, film-forming assistants, sag control agents (SCAs), flame retardants, corrosion inhibitors, waxes, siccatives, biocides, and flatting agents.

Suitable adjuvants of the aforementioned kind are known, for example, from

German patent application DE 199 48 004 A1, page 14, line 4 to page 17, line 5,

German patent DE 100 43 405 C1 column 5, paragraphs [0031] to [0033]. They are used in the customary and known amounts.

The solids content of the basecoat materials of the invention may vary according to the requirements of the case in hand. The solids content is guided primarily by the viscosity required for application, more particularly for spray application, and so may be adjusted by the skilled person on the basis of his or her general art knowledge, optionally with assistance from a few exploratory tests.

The solids content of the basecoat materials is preferably 5 to 70 wt %, more preferably 10 to 65 wt %, and especially preferably 15 to 60 wt %.

The basecoat material of the invention is aqueous. The expression "aqueous" is known in this context to the skilled person. The phrase refers in principle to a basecoat material which is not based exclusively on organic solvents, i.e., does not contain exclusively organic-based solvents as its solvents but instead, in contrast, includes a significant fraction of water as solvent. "Aqueous" for the purposes of the present invention, in relation to coating compositions, should preferably be understood to mean that the coating composition in question, more particularly the basecoat material, has a water fraction of at least 40 wt %, preferably at least 50 wt %, very preferably at least 60 wt %, based in each case on the total amount of the solvents present (i.e., water and organic solvents). Preferably in turn, the water fraction is 40 to 90 wt %, more particularly 50 to 80 wt %, very preferably 60 to 75 wt %, based in each case on the total amount of the solvents present.

The basecoat materials employed in accordance with the invention may be produced using the mixing assemblies and mixing techniques that are customary and known for producing basecoat materials.

The Process of the Invention and the Multicoat Paint System of the Invention

A further aspect of the present invention is a process for producing a multicoat paint system, where (1) a pigmented aqueous basecoat material is applied to a substrate, (2) a polymer film is formed from the coating material applied in stage (1), (3) a clearcoat material is applied to the resulting basecoat film, and then (4) the basecoat film is cured together with the clearcoat film, which comprises using in stage (1) a pigmented aqueous basecoat material which comprises at least one aqueous dispersion of the invention. All of the above observations relating to the dispersion of the invention and to the pigmented aqueous basecoat material are also valid in respect of the process of the invention. This is true more particularly also of all preferred, very preferred, and especially preferred features.

Said process is preferably used to produce multicoat color paint systems, effect paint systems, and color and effect paint systems.

The pigmented aqueous basecoat material of the invention is commonly applied to metallic or plastics substrates that have been pretreated with surfacer or primer-surfacer. Said basecoat material may optionally also be applied directly to the plastics substrate.

Where a metallic substrate is to be coated, it is preferably further coated with an electrocoat system before the surfacer or primer-surfacer is applied.

Where a plastics substrate is being coated, it is preferably also pretreated before the surfacer or primer-surfacer is applied. The techniques most frequently employed for such pretreatment are those of flaming, plasma treatment, and corona discharge. Flaming is used with preference.

Application of the pigmented aqueous basecoat material of the invention to a metallic substrate may take place in the film thicknesses customary within the automobile industry, in the range, for example, of 5 to 100 micrometers, preferably 5 to 60 micrometers. This is done using spray application methods, for example compressed air spraying, airless spraying, high-speed rotation, electrostatic spray application (ESTA), alone or in conjunction with hot spray application, for example hot air spraying.

Following the application of the pigmented aqueous basecoat material, it can be dried by known methods. For example, (1-component) basecoat materials, which are preferred, can be flashed at room temperature for 1 to 60 minutes and subsequently dried, preferably at optionally slightly elevated temperatures of 30 to 90° C. Flashing and drying in the context of the present invention mean the evaporation of organic solvents and/or water, as a result of which the paint becomes drier but has not yet cured or not yet formed a fully crosslinked coating film.

Then a commercial clearcoat material is applied, by likewise common methods, the film thicknesses again being within the customary ranges, for example 5 to 100 micrometers.

After the clearcoat material has been applied, it can be flashed at room temperature for 1 to 60 minutes, for example, and optionally dried. The clearcoat material is then cured together with the applied pigmented basecoat material. In the course of these procedures, crosslinking reactions occur, for example, to produce on a substrate a multicoat color and/or effect paint system of the invention. Curing takes place preferably thermally at temperatures from 60 to 200° C. Thermally curing basecoat materials are preferably those which comprise as crosslinking agent an aminoplast resin or a blocked or nonblocked polyisocyanate, preferably an aminoplast resin. Among the aminoplast resins, melamine resins are preferred.

Plastics substrates are coated basically in the same way as metallic substrates. Here, however, in general, curing takes place at significantly lower temperatures, of 30 to 90° C. Preference is therefore given to the use of two-component clearcoat materials.

The process of the invention can be used to paint metallic and nonmetallic substrates, more particularly plastics substrates, preferably automobile bodies or parts thereof.

The process of the invention can be used further for dual finishing in OEM finishing. This means that a substrate which has been coated by means of the process of the invention is painted for a second time, likewise by means of the process of the invention.

The invention relates further to multicoat paint systems which are producible by the process described above. These multicoat paint systems are to be referred to below as multicoat paint systems of the invention.

All of the above observations relating to the polymer of the invention, to the pigmented aqueous basecoat material, and to the method of the invention are also valid in respect of said multicoat paint system. This is also true especially of all the preferred, more preferred, and most preferred features.

The multicoat paint systems of the invention are preferably multicoat color paint systems, effect paint systems, and color and effect paint systems.

A further aspect of the invention relates to the process of the invention, wherein said substrate from stage (1) is a multicoat paint system having defect sites. This substrate/multicoat paint system, which possesses defect sites, is therefore an original finish, which is to be repaired or completely recoated.

The process of the invention is suitable accordingly for repairing defects on multicoat paint systems. Film defects are generally faults on and in the coating, usually named according to their shape or their appearance. The skilled person is aware of a host of possible kinds of such film defects. They are described for example in Rompp-Lexikon Lacke and Druckfarben, Georg Thieme Verlag, Stuttgart, N.Y., 1998, page 235, "Film defects".

In one preferred embodiment of the process of the invention, the substrate from stage (1) is a multicoat paint system which has defect sites.

These multicoat paint systems are produced preferably on automobile bodies or parts thereof, by means of the process of the invention, identified above, in the context of automotive OEM finishing. Where such defects occur directly after OEM finishing has taken place, they are repaired immediately. The term "OEM automotive refinishing" is therefore also used. Where only small defects require repair, only the "spot" is repaired, and the entire body is not completely recoated (dual coating). The former process is called "spot repair". The use of the process of the invention for remedying defects on multicoat paint systems (original finishes) of the invention in OEM automotive refinishing, therefore, is particularly preferred.

Where reference is made, in the context of the present invention, to the automotive refinish segment, in other words when the repair of defects is the topic, and the substrate specified is a multicoat paint system possessing defects, this of course means that this substrate/multicoat paint system with defects (original finish) is generally located on a plastic substrate or on a metallic substrate as described above.

So that the repaired site has no color difference from the rest of the original finish, it is preferred for the aqueous basecoat material used in stage (1) of the process of the invention for repairing defects to be the same as that which was used to produce the substrate/multicoat paint system with defects (original finish).

The observations above concerning the polymer of the invention and the aqueous pigmented basecoat material therefore are also valid for the use, under discussion, of the process of the invention for repairing defects on a multicoat paint system. This is also true in particular of all stated preferred, very preferred, and especially preferred features. It is additionally preferred for the multicoat paint systems of the invention that are to be repaired to be multicoat color paint systems, effect paint systems, and color and effect paint systems.

The above-described defect sites on the multicoat paint system of the invention can be repaired by means of the above-described process of the invention. For this purpose, the surface to be repaired on the multicoat paint system may initially be abraded. The abrading is preferably performed by partially sanding, or sanding off, only the basecoat and the clearcoat from the original finish, but not sanding off the primer layer and surfacer layer that are generally situated beneath them. In this way, during the refinish, there is no need in particular for renewed application of specialty primers and primer-surfacers. This form of abrading has become established especially in the OEM automotive refinishing segment, since here, in contrast to refinishing in a workshop, generally speaking, defects occur only in the basecoat and/or clearcoat region, but do not, in particular, occur in the region of the underlying surfacer and primer coats. Defects in the latter coats are more likely to be encountered in the workshop refinish sector. Examples include paint damage such as scratches, which are produced, for example, by mechanical effects and which often extend down to the substrate surface (metallic or plastic substrate).

After the abrading procedure, the pigmented aqueous basecoat material is applied to the defect site in the original finish, generally by pneumatic atomization. After the pigmented aqueous basecoat material has been applied, it can be dried by known methods. For example, the basecoat material may be dried at room temperature for 1 to 60 minutes and subsequently dried at optionally slightly elevated temperatures of 30 to 80° C. Flashing and drying for the purposes of the present invention means evaporation of organic solvents and/or water, whereby the coating material is as yet not fully cured. For the purposes of the present invention it is preferred for the basecoat material to comprise an aminoplast resin, preferably a melamine resin, as crosslinking agent, and a binder that is reactive with this crosslinking agent.

A commercial clearcoat material is subsequently applied, by techniques that are likewise commonplace. Following application of the clearcoat material, it may be flashed off at room temperature for 1 to 60 minutes, for example, and optionally dried. The clearcoat material is then cured together with the applied pigmented basecoat material.

In the case of so-called low-temperature baking, curing takes place preferably at temperatures of 20 to 90° C. Preference here is given to using two-component clearcoat materials. If, as described above, an aminoplast resin is used as crosslinking agent, there is only slight crosslinking by the aminoplast resin in the basecoat film at these temperatures. Here, in addition to its function as a curing agent, the aminoplast resin also serves for plasticizing and may assist pigment wetting. Besides the aminoplast resins, nonblocked isocyanates may also be used. Depending on the nature of the isocyanate used, they crosslink at temperatures from as low as 20° C.

In the case of what is called high-temperature baking, curing is accomplished preferably at temperatures of 130 to 150° C. Here both one-component and two-component clearcoat materials are used. If, as described above, an aminoplast resin is used as crosslinking agent, there is crosslinking by the aminoplast resin in the basecoat film at these temperatures.

For repairing defects on multicoat paint systems, in other words when the substrate is an original finish with defects, preferably a multicoat paint system of the invention that exhibits defects, low-temperature baking is preferably employed.

A further aspect of the present invention is the use of the aqueous dispersions of the invention in pigmented aqueous basecoat materials for improving adhesion.

The aqueous dispersions of the invention can be used for improving adhesion in the finishing of metallic and plastics substrates. They can also be employed in automotive refinishing. By automotive refinishing is meant both OEM automotive refinishing and the automotive refinishing that takes place in a workshop, for example.

Where said pigmented aqueous basecoat materials are used in the finishing of metallic and plastics substrates, the use of the aqueous dispersion of the invention results in particular in an improvement in the adhesion between the basecoat film and the clearcoat film that is immediately adjacent to it. The dispersion of the invention is therefore used with preference for improving adhesion between basecoat film and clearcoat film in the finishing of metallic substrates and plastics substrates.

Where said pigmented aqueous basecoat materials are used in automotive refinishing, the use of the aqueous dispersion of the invention results in particular in an improvement in adhesion between basecoat and original finish. The aqueous dispersion of the invention is therefore likewise used with preference for improving the adhesion between basecoat film and original finish in automotive refinishing, more preferably in OEM automotive refinishing.

The adhesion difficulties affecting systems of the prior art are especially striking when the coated substrates are exposed to weathering. Corresponding weathering conditions can be simulated by condensing water storage. The term "condensing water storage" denotes the storage of coated substrates in a climatic chamber in accordance with CH test conditions in accordance with DIN EN ISO 6270-2:2005-09.

The aqueous dispersions of the invention are therefore also used in particular to improve the adhesion after condensation water storage. The adhesion is investigated preferably in a steam jet test according to test method A of DIN 55662:2009-12.

When coated substrates are exposed to weathering, blisters and swelling are a common occurrence. The aqueous dispersions of the invention are therefore also used in particular to reduce or prevent the incidence of blisters and swelling in multicoat paint systems.

The presence of blisters and swelling can be appraised visually.

The invention is elucidated below in the form of examples.

The inventive and comparative examples which follow serve to elucidate the invention, but should not be interpreted as imposing any restriction.

INVENTIVE AND COMPARATIVE EXAMPLES

Unless otherwise indicated, the amounts in parts are parts by weight and amounts in percent are in each case percentages by weight.

1. Components Employed

The definitions of the components identified below and used in preparing the dispersions of the invention and also the waterborne basecoat materials of the invention comprising the dispersions of the invention as binders, and the corresponding comparative examples, are as follows:

Aerosol® EF-800 is a commercially available emulsifier from Cytec.

APS is used as an abbreviation of the chemical compound ammonium peroxodisulfate.

1,6-HDDA is used as an abbreviation of the chemical compound 1,6-hexanediol diacrylate.

VEOVA™10 is a commercially available monomer from Momentive. The monomer is the vinyl ester of Versatic™Acid 10.

2-HEA is used as an abbreviation of the chemical compound 2-hydroxyethyl acrylate.

MMA is used as an abbreviation of the chemical compound methyl methacrylate.

Sipomer PAM-200 is a commercially available phosphate ester of polypropylene glycol monomethyl acrylate from Solvay.

DMEA is used as an abbreviation of the chemical compound dimethylethanolamine.

Rhodapex® CO 436 is a commercially available emulsifier from Solvay, Rhodia.

Cymel® 303 is a commercially available melamine-formaldehyde resin from Allnex.

Rheovis® AS 1130 is a commercially available rheology additive for aqueous coating materials, from BASF SE.

Pluriol® E300 is a commercially available polyethylene glycol from BASF SE.

2. Examples of Syntheses of the Aqueous Dispersions Comprising at Least One Multistage Polymer 2.1 Preparation of Aqueous Dispersions BM1, BM2, and BM3, Comprising a Seed-Core-Shell Acrylate SCS1, SCS2, and SCS3 (Inventive)

80 wt % of items 1 and 2 in table 2.1 are placed into a steel reactor (5 L volume) with reflux condenser, and heated to 80° C. The remaining fractions of the components listed under "initial charge" in table 2.1 are premixed in a separate vessel. This mixture and the initiator solution are added dropwise to the reactor over 20 minutes, where a monomers concentration of 6.0 wt % in the reaction solution is not exceeded throughout the reaction period. This is followed by stirring for 30 minutes. (Corresponds to stage i).)

The components indicated under "mono 1" in table 2.1 are premixed in a separate vessel. This mixture is added dropwise to the reactor over 2 hours, where a monomers concentration of 6.0 wt % in the reaction solution is not exceeded throughout the reaction period. This is followed by 1 hour of stirring. (Corresponds to stage ii).)

The components indicated under "mono 2" in table 2.1 are premixed in a separate vessel. This mixture is added dropwise to the reactor over 1 hour, where a monomers concentration of 6.0 wt % in the reaction solution is not exceeded throughout the reaction period. This is followed by 2 hours of stirring. (Corresponds to stage iii).)

The reaction mixture is thereafter cooled to 60° C. and the neutralizing mixture is premixed in a separate vessel. The neutralizing mixture is added dropwise to the reactor over 40 minutes, wherein the pH of the reaction solution is adjusted to a pH of 6.5 to 9.0. The reaction product is subsequently stirred for 30 minutes more, cooled to 25° C., and filtered. (Corresponds to stage iv).)

TABLE 2.1

Aqueous dispersions BM1 to BM3 comprising seed-core-shell acrylates SCS1 to SCS3 (according to the invention)

| | | BM1 | BM2 | BM3 |
|---|---|---|---|---|
| | Initial charge | | | |
| 1 | DI water | 43.54 | 43.54 | 41.81 |
| 2 | EF 800 | 0.18 | 0.19 | 0.18 |
| 3 | Styrene | 0.5 | 0.5 | 0.48 |
| 4 | n-Butyl acrylate | | | 0.68 |
| 5 | Ethyl acrylate | 0.55 | 0.55 | |
| | Initiator solution | | | |
| 6 | DI water | 0.55 | 0.53 | 0.53 |
| 7 | APS | 0.02 | 0.02 | 0.02 |
| | Mono 1 | | | |
| 8 | DI water | 13.31 | 13.31 | 12.78 |
| 9 | EF 800 | 0.15 | 0.15 | 0.15 |
| 10 | APS | 0.02 | 0.02 | 0.02 |
| 11 | Styrene | 5.84 | 5.84 | 5.61 |
| 12 | n-Butyl acrylate | | | 13.6 |
| 13 | Ethyl acrylate | 11.05 | 9.47 | |
| 14 | 1,6-HDDA | 0.35 | 0.35 | 0.34 |
| 15 | VEOVA™10 | | 1.58 | |
| | Mono 2 | | | |
| 16 | DI water | 5.97 | 5.97 | 5.73 |
| 17 | EF 800 | 0.07 | 0.07 | 0.07 |
| 18 | APS | 0.02 | 0.02 | 0.02 |
| 19 | Methacrylic acid | 0.74 | 0.74 | 0.71 |
| 20 | 2-HEA | 0.31 | 0.99 | 0.85 |
| 21 | n-Butyl acrylate | | | 1.87 |
| 22 | Ethyl acrylate | 3.04 | 3.04 | |
| 23 | MMA | | 0.6 | 0.58 |
| 24 | Sipomer PAM | 0.68 | | |
| 25 | VEOVA™10 | | | 1.87 |
| | Neutralizing | | | |
| 26 | DI water | 6.75 | 6.75 | 6.48 |
| 27 | Butyl glycol | 4.96 | 4.96 | 4.76 |
| 28 | DMEA | 0.79 | 0.79 | 0.76 |
| | pH | 7.2 | 8.5 | 8.2 |

The solids content was determined for the purpose of reaction monitoring. The results are reported in table 2.2:

TABLE 2.2

Solids content of the aqueous dispersions BM1 to BM3

| | BM1 | BM2 | BM3 |
|---|---|---|---|
| Solids content | 23.7 | 21.5 | 25.4 |

After each stage i) to iv), the particle size of the polymers was determined by means of dynamic light scattering in accordance with DIN ISO 13321. The results are reproduced in table 2.3.

TABLE 2.3

Particle sizes in nm of the seed-core-shell acrylates SCS1 to SCS3 after each stage i) to iv)

| | | SCS1 | SCS2 | SCS3 |
|---|---|---|---|---|
| i | After "initial charge" | 60 | 70 | 70 |
| ii | After "Mono 1" | 140 | 130 | 153 |
| iii | After "Mono 2" | 210 | 212 | 194 |
| iv | After neutralizing | 236 | 225 | 236 |

Each of the stated monomer mixtures was polymerized individually and thereafter the glass transition temperature was determined by means of DSC in accordance with DIN standard 53765. Also determined was the glass transition temperature for the overall polymer, after neutralization, by means of DSC in accordance with DIN standard 53765.

The results are reported in table 2.4.

TABLE 2.4

Glass transition temperatures in ° C. of individual stages of the seed-core-shell acrylates SCS1 to SCS3

| | | SCS1 | SCS2 | SCS3 |
|---|---|---|---|---|
| i | "Initial charge" | 33 | 36 | 32 |
| ii | "Mono 1" | −12 | −15 | −11 |
| iii | "Mono 2" | 9 | −1 | −5 |
| | Overall polymer | −8 | −10 | −11 |

2.2 Preparation of an Aqueous Dispersion BM5 Comprising a Three-Stage Acrylate SCS5 (as Per Korea Polym. J., Vol. 7, No. 4, Pp. 213-222; not Inventive)

Components 1 to 4 from table 2.5 are placed into a steel reactor (5 L volume) with reflux condenser, and heated to 80° C. The initiator solution (table 2.5, items 5 and 6) is added dropwise to the reactor over 5 minutes. This is followed by stirring for 30 minutes.

The components indicated under "mono 1" in table 2.5 are premixed in a separate vessel. This mixture is added dropwise to the reactor over 2 hours. This is followed by 1 hour of stirring.

The components indicated under "mono 2" in table 2.5 are premixed in a separate vessel. This mixture is added dropwise to the reactor over 1 hour. This is followed by 1 hour of stirring.

The reaction mixture is thereafter cooled to 60° C. and the neutralizing mixture (table 2.5, items 20 to 22) is premixed in a separate vessel. The neutralizing mixture is added dropwise to the reactor over 40 minutes. The reaction product is subsequently stirred for 30 minutes more and cooled to 25° C.

TABLE 2.5

Multistage acrylate BM5

| | | BM5 |
|---|---|---|
| | Initial charge | |
| 1 | DI water | 43.54 |
| 2 | Rhodapex CO 436 | 0.16 |
| 3 | Styrene | 0.5 |

TABLE 2.5-continued

Multistage acrylate BM5

| | | BM5 |
|---|---|---|
| 4 | Ethyl acrylate | 0.55 |
| | Initiator solution | |
| 5 | DI water | 0.55 |
| 6 | APS | 0.02 |
| | Mono 1 | |
| 7 | DI water | 13.31 |
| 8 | Rhodapex CO 436 | 0.13 |
| 9 | APS | 0.02 |
| 10 | Styrene | 5.84 |
| 11 | Ethyl acrylate | 11.05 |
| 12 | 1,6-HDDA | 0.35 |
| | Mono 2 | |
| 13 | DI water | 5.97 |
| 14 | Rhodapex CO 436 | 0.06 |
| 15 | APS | 0.02 |
| 16 | Methacrylic acid | 0.74 |
| 17 | 2-HEA | 0.99 |
| 18 | Ethyl acrylate | 3.04 |
| 19 | MMA | 0.6 |
| | Neutralizing | |
| 20 | DI water | 6.75 |
| 21 | Butyl glycol | 4.96 |
| 22 | DMEA | 0.79 |
| | pH | 8.1 |

The solids content was 23.4%.

After each stage i) to iv), the particle size of the polymer was determined by means of dynamic light scattering in accordance with DIN ISO 13321. The results are reproduced in table 2.6.

TABLE 2.6

Particle sizes in nm of the acrylate SCS5 after each stage i) to iv)

| | | SCS5 |
|---|---|---|
| i | After "initial charge" | 110 |
| ii | After "Mono 1" | 196 |
| iii | After "Mono 2" | 223 |
| iv | After neutralizing | 310 |

Each of the stated monomer mixtures was polymerized individually and thereafter the glass transition temperature was determined by means of DSC in accordance with DIN standard 53765. Also determined was the glass transition temperature for the overall polymer, after neutralization, by means of DSC in accordance with DIN standard 53765.

The results are reported in table 2.7.

TABLE 2.7

Glass transition temperatures in ° C. of the individual stages of the multistage acrylate SCS5

| | | SCS5 |
|---|---|---|
| i | "Initial charge" | 32 |
| ii | "Mono 1" | 26 |
| iii | "Mono 2" | 35 |
| | Overall polymer | 26 |

3. Examples of Paint Formulations 3.1 Preparation of the Noninventive Waterborne Basecoat Materials A1 and A2 Based on the Aqueous Dispersion BM5 (as Per Korea Polym. J., Vol. 7, No. 4, pp. 213-222)

The components listed under "aqueous phase" in table 3.1 are stirred together in the order stated to form an aqueous mixture. In the next step, an organic mixture is prepared from the components listed under "organic phase". The organic mixture is added to the aqueous mixture. This is followed by stirring for 10 minutes, and then a pH of 8 and a spray viscosity of 90-95 mPa·s under a shearing load of 1000 s$^{-1}$, as measured using a rotary viscometer (Rheolab QC instrument with C-LTD80/QC heating system, from Anton Paar) at 23° C. are set using deionized water and dimethylethanolamine.

TABLE 3.1

Waterborne basecoat materials A1 and A2 (not inventive)

| | A1 | A2 |
|---|---|---|
| Aqueous phase | | |
| 3% strength Na—Mg phyllosilicate solution | 10.00 | |
| Aqueous dispersion BM5 (as per Korea. Polym. J., vol. 7, no. 4, pp. 213-222) | 28.40 | 28.40 |
| Deionized water | 30.30 | 39.30 |
| Polyester prepared as per example D, column 16, lines 37-59 of DE 40 09 858 A1 | 2.70 | 2.70 |
| n-Butoxypropanol | 3.20 | 3.20 |
| Melamine-formaldehyde resin (Cymel ® 303 from Allnex) | 3.20 | 3.20 |
| 10% strength dimethylethanolamine in water | 2.30 | 2.30 |
| Polyurethane-modified polyacrylate, prepared as per page 7, line 55 to page 8, line 23 of DE 4437535 A1 | 3.60 | 3.60 |
| Rheovis ® AS 1130 (available from BASF SE) | 1.50 | 2.50 |
| Organic phase | | |
| Butyl glycol | 7.00 | 7.00 |
| Pluriol ® E300 from BASF SE | 2.80 | 2.80 |
| Aluminum pigment available from Altana-Eckart (Alu Stapa Hydrolux 8154) | 5.00 | 5.00 |

3.2 Preparation of the Inventive Waterborne Basecoat Materials A3 and A4 Based on the Aqueous Dispersion BM1

The components listed under "aqueous phase" in table 3.2 are stirred together in the order stated to form an aqueous mixture. In the next step, an organic mixture is prepared from the components listed under "organic phase". The organic mixture is added to the aqueous mixture. This is followed by stirring for 10 minutes, and a pH of 8 and a spray viscosity of 100±5 mPa·s (A3) or 140±5 mPa·s (A4) under a shearing load of 1000 s$^{-1}$, measured using a rotary viscometer (Rheolab QC instrument with C-LTD80/QC heating system, from Anton Paar) at 23° C., are set using deionized water and dimethylethanolamine.

TABLE 3.2

Inventive aqueous basecoat materials A3 and A4

| | A3 | A4 |
|---|---|---|
| Aqueous phase | | |
| 3% strength Na—Mg phyllosilicate solution | | 10.00 |
| Aqueous dispersion BM1 | 30.05 | 30.05 |
| Deionized water | 29.15 | 20.35 |

TABLE 3.2-continued

Inventive aqueous basecoat materials A3 and A4

|  | A3 | A4 |
|---|---|---|
| Polyester prepared as per example D, column 16, lines 37-59 of DE 40 09 858 A1 | 2.70 | 2.70 |
| n-Butoxypropanol | 3.20 | 3.20 |
| Melamine-formaldehyde resin (Cymel ® 303 from Allnex) | 3.20 | 3.20 |
| Deionized water | 10.00 | 10.00 |
| Polyurethane-modified polyacrylate; prepared as per page 7, line 55 to page 8, line 23 of DE 4437535 A1 | 3.60 | 3.60 |
| Rheovis ® AS 1130 (available from BASF SE) | 1.50 | 1.30 |
| 10% strength dimethyl-ethanolamine in water | 1.80 | 0.80 |
| Organic phase | | |
| Butyl glycol | 7.00 | 7.00 |
| Pluriol ® E300 from BASF SE | 2.80 | 2.80 |
| Aluminum pigment available from Altana-Eckart (Alu Stapa Hydrolux 8154) | 5.00 | 5.00 |

3.3 Preparation of the Inventive Waterborne Basecoat Materials A6 and A7 Based on the Inventive Aqueous Dispersions BM2 and BM3

The components listed under "aqueous phase" in table 3.3 are stirred together in the order stated to form an aqueous mixture. In the next step, an organic mixture is prepared from the components listed under "organic phase". The organic mixture is added to the aqueous mixture. This is followed by stirring for 10 minutes, and then a pH of 8 and a spray viscosity of 120±5 mPa·s (A6 and A7) under a shearing load of 1000 s$^{-1}$, as measured using a rotary viscometer (Rheolab QC instrument with C-LTD80/QC heating system, from Anton Paar) at 23° C. are set using deionized water and dimethylethanolamine.

TABLE 3.3

Inventive waterborne basecoat materials A6 and A7

|  | A6 | A7 |
|---|---|---|
| Aqueous phase | | |
| 3% strength Na—Mg phyllosilicate solution | 10.00 | 10.00 |
| Aqueous dispersion BM2 | 30.45 | |
| Aqueous dispersion BM3 | | 26.15 |
| Deionized water | 19.50 | 23.80 |
| Polyester prepared as per example D, column 16, lines 37-59 of DE 40 09 858 A1 | 2.70 | 2.70 |
| n-Butoxypropanol | 3.20 | 3.20 |
| Melamine-formaldehyde resin (Cymel ® 303 from Allnex) | 3.20 | 3.20 |
| Deionized water | 10.00 | 10.00 |
| Polyurethane-modified polyacrylate; prepared as per page 7, line 55 to page 8, line 23 of DE 4437535 A1 | 3.60 | 3.60 |
| Rheovis ® AS 1130 (available from BASF SE) | 1.75 | 1.75 |
| 10% strength dimethyl-ethanolamine in water | 0.80 | 0.80 |

TABLE 3.3-continued

Inventive waterborne basecoat materials A6 and A7

|  | A6 | A7 |
|---|---|---|
| Organic phase | | |
| Butyl glycol | 7.00 | 7.00 |
| Pluriol ® E300 from BASF SE | 2.80 | 2.80 |
| Aluminum pigment available from Altana-Eckart (Alu Stapa Hydrolux 8154) | 5.00 | 5.00 |

Results 4.1 Descriptions of Methods 4.1.1 Determination of Lightness and Flop Index For determining the lightness or the flop index, an inventive coating composition (or a comparative coating composition) is applied by means of dual application as waterborne basecoat material to a steel panel coated with a primer-surfacer coating and having dimensions of 32×60 cm, where, in the first step, application takes place electrostatically with a dry film thickness of 8-9 μm, and in the second step, application takes place after a 2-minute flashing time at room temperature (18 to 23° C.), pneumatically with a dry film thickness of 4-5 μm. The resulting waterborne basecoat film is subsequently dried, after a further flashing time of 5 minutes at room temperature, in a forced air oven at 80° C. for 5 minutes. Applied over the dried waterborne basecoat film is a commercial two-component clearcoat material (ProGloss® from BASF Coatings GmbH), with a dry film thickness of 40-45 μm. The resulting clearcoat film is flashed at room temperature (18 to 23° C.) for a period of 10 minutes, followed by curing in a forced air oven at 140° C. for 20 minutes more. The substrate coated accordingly is subjected to measurement using an X-Rite spectrophotometer (X-Rite MA68 multi-angle spectrophotometer). In this case, the surface is illuminated using a light source. Spectral detection in the visible range is carried out from different angles. From the resulting spectral measurements it is possible, with incorporation of the standard spectral values and also of the reflection spectrum of the light source used, to calculate color values in the CIEL*a*b* color space, where L* characterizes the lightness, a* the red-green value, and b* the yellow-blue value. This method is described in ASTM E2194-12, for example, particularly for coatings comprising at least one effect pigment as pigment. The derived value which is often employed to quantify the metallic effect is the so-called flop index, which describes the relationship between lightness and observation angle (cf. A. B. J. Rodriguez, JOCCA, 1992 (4), pp. 150-153). The flop index (FL) can be calculated from the lightness values found for the viewing angles of 15°, 45°, and 110°, in accordance with the formula $$FL = 2.69(L^*_{15°} - L^*_{110°})^{1.11}/(L^*_{45°})^{0.86}$$

where L* is the lightness value measured at the respective measurement angle (15°, 45°, and 110°).

4.1.2 Assessment of Appearance Before and after Condensation Exposure

The leveling or waviness of the coated substrates is assessed using a Wave scan instrument from Byk/Gardner. The coated substrates are produced by dual application as described in section 4.1.1 (Determining the lightness and the flop index).

For this purpose, a laser beam is directed at an angle of 60° onto the surface under investigation, and the instrument records the fluctuations in the reflected light over a distance of 10 cm in the shortwave region (0.3 to 1.2 mm) and in the longwave region (1.2 to 12 mm) (longwave=LW; shortwave=SW; the lower the values, the better the appearance). Furthermore, as a measure of the sharpness of an image reflected in the surface of the multilayer system, the instrument determines the parameter of "distinctness of image" (DOI) (the higher the value, the better the appearance).

These measurements are carried out before and after condensation exposure. For this purpose, the coated substrates are stored over a period of 10 days in a climate chamber under CH test conditions according to DIN EN ISO 6270-2:2005-09 (date: September 2005). The coated substrates are subsequently inspected for swelling and blistering, 24 hours after removal from the climate chamber and the profile and waviness are assessed.

The incidence of blisters is in this case assessed as follows by a combination of two values:
- The number of blisters is evaluated by a quantity figure from 1 to 5, with m1 denoting very few and m5 very many blisters.
- The size of the blisters is evaluated by a size report, likewise from 1 to 5, with g1 denoting very small and g5 very large blisters.

The designation m0g0, accordingly, denotes a blister-free finish after condensation water storage, and represents a satisfactory result in terms of blistering.

4.1.3 Determination of the Adhesion Properties

For determining the adhesion properties of the inventive coating compositions (or of comparative compositions), multicoat paint systems are produced in accordance with the following general protocol:

Original Finish

Atop a metallic substrate coated with a cured electrocoat system (CathoGuard® 500 from BASF Coatings GmbH) with dimensions of 10 20 cm, the waterborne basecoat material is applied by means of dual application; in the first step, application takes place electrostatically with a target film thickness of 8-9 μm, and in the second step, after a 2-minute flashing time at room temperature, pneumatically with a target film thickness of 4-5 μm. The resulting waterborne basecoat film is subsequently dried, after a further flashing time of 5 minutes at room temperature, in a forced air oven at 80° C. for 5 minutes. Applied over the dried waterborne basecoat film is a commercial two-component clearcoat material (ProGloss from BASF Coatings GmbH), with a target film thickness of 40-45 μm. The resulting clearcoat film is flashed at room temperature for 10 minutes, followed by curing in a forced air oven at 140° C. for 20 minutes more. The system obtainable in this way is referred to below as original finish (system a).

Alternatively, curing of the basecoat and clearcoat films is carried out at 60 minutes/140° C. (referred to hereinafter as overbaked original finish; system c).

Refinishes

Over the original finish or alternatively over the overbaked original finishes, the waterborne basecoat material is again applied by dual application, with application in the first step taking place electrostatically (target film thickness of 8-9 μm) and in the second step, after a 2-minute flashing time at room temperature, pneumatically (target film thickness of 4-5 μm). The resulting waterborne basecoat film, after a further 5-minute flashing time at room temperature, is subsequently dried in a forced air oven at 80° C. for 10 minutes. Over this dried waterborne basecoat film, a commercial two-component clearcoat material (ProGloss from BASF Coatings GmbH) is applied, with a target film thickness of 40-45 μm. The resulting clearcoat film is flashed at room temperature for 10 minutes; this is followed by curing in a forced air oven at 140° C. for 20 minutes more. The system obtainable accordingly is referred to below as refinish; depending on drying conditions of the original finish two different multicoat systems result: system A is a refinish on system a; system C is a refinish on system c.

The technological properties of the multicoat systems were assessed by implementing cross-cuts according to DIN EN ISO 2409 (rating GT 0 to GT 5; 0=best score; 5=worst score). The corresponding investigations were performed on unexposed samples and also following exposure to condensation water. The condensation exposure, including subsequent assessment of the exposed samples for swelling and blistering, takes place as described in section 4.1.2 (Assessment of appearance before and after condensation exposure).

4.1.4 Determining the Initial Viscosity

The initial viscosity is determined after the basecoat material components have been weighed out in accordance with the preparation protocols described below, but before the adjustment of the materials in question to a pH of 8 using dimethanolamine and also to a specified spray viscosity, by measuring the viscosity under a shear load of 1000 s$^{-1}$ with a rotational viscometer (Rheolab QC instrument with C-LTD80/QC temperature control system from Anton Paar) at 23° C.

4.1.6 Determining the Solids Content

The solids content of the basecoat materials is determined according to DIN EN ISO 3251, table A.1 (date: Jun. 1, 2008). Here, 1 g of sample are weighed out into an aluminum dish which has been dried before-hand, and the sample is dried in a drying cabinet at 130° C. for 60 minutes, cooled in a desiccator, and then weighed again. The residue, based on the total amount of the sample used, corresponds to the solids content.

4.2 Comparison Between the Inventive Waterborne Basecoat Material A3 and the Noninventive Waterborne Basecoat Material A2 in Terms of Shade and Adhesion Investigations on the waterborne basecoat materials A2 and also A3 take place in accordance with the methods described above. Tables 4.1 and 4.2 summarize the results.

4.2.1 Comparison Between the Inventive Waterborne Basecoat Material A3 and the Noninventive Waterborne Basecoat Material A2 in Terms of Shade

TABLE 4.1

Results in terms of shade

|  | A2 | A3 |
|---|---|---|
| $L^*_{15°}$ | 118.2 | 124.3 |
| $L^*_{25°}$ | 99.0 | 103.0 |
| $L^*_{45°}$ | 66.1 | 66.6 |
| $L^*_{75°}$ | 44.2 | 42.8 |
| $L^*_{110°}$ | 36.8 | 35.4 |
| Flop index | 9.7 | 10.6 |

Using the inventive aqueous dispersion BM1 comprising the seed-core-shell acrylate SCS1 in the waterborne basecoat material A3 leads, in comparison to the reference, the noninventive dispersion BM5 comprising the multistage acrylate SCS5 in the waterborne basecoat material A2, to an increase in the flop index, in other words to an improvement in the aluminum flake orientation.

4.2.2 Comparison Between the Inventive Waterborne Basecoat Material A3 and the Noninventive Waterborne Basecoat Material A2 in Terms of Adhesion Before and after Condensation Exposure

TABLE 4.2

| Results for adhesion before and after condensation exposure | | |
|---|---|---|
| Clearcoat baking conditions in original system | A2 | A3 |
| Adhesion of original finish before/after condensation exposure | | |
| System a before condensation exposure | GT0 | GT0 |
| System a after condensation exposure | GT0 | GT0 |
| Refinish adhesion before condensation exposure | | |
| A: standard (140° C./20 minutes) | GT0 | GT0 |
| C: overbaked (140° C./60 minutes) | GT3 | GT0 |
| Refinish adhesion after condensation exposure | | |
| A: standard (140° C./20 minutes) | GT0 | GT0 |
| C: overbaked (140° C./60 minutes) | GT1 | GT0 |

The inventive waterborne basecoat material A3 based on the aqueous dispersion BM1 comprising the seed-core-shell acrylate SCS1 exhibits no adhesion problems in any of the multicoat systems. Conversely, the noninventive waterborne basecoat material A2 based on the noninventive aqueous dispersion BM5 comprising the multistage acrylate SCS5 exhibits poorer adhesion, especially before condensation exposure, when the clearcoat of the original finish is overbaked at 140° C. for 60 minutes (system C) (plane of separation: refinish system on original system).

4.3 Comparison of Inventive Waterborne Basecoat Materials A4, A6 and A7 with Noninventive Waterborne Basecoat Material A1

4.3.1 Comparison of Inventive Waterborne Basecoat Materials A4, A6 and A7 with Noninventive Waterborne Basecoat Material A1 in Terms of Shade

| | A1 | A4 | A6 | A7 |
|---|---|---|---|---|
| $L^*_{15°}$ | 125.5 | 134.7 | 127.1 | 128.6 |
| $L^*_{25°}$ | 102.27 | 105.1 | 103.8 | 104.2 |
| $L^*_{45°}$ | 64.0 | 60.6 | 64.5 | 63.8 |
| $L^*_{75°}$ | 41.1 | 38.1 | 40.8 | 40.3 |
| $L^*_{110°}$ | 34.2 | 32.5 | 34.0 | 33.9 |
| Flop index | 11.3 | 13.4 | 11.5 | 11.8 |

Using the inventive aqueous dispersions BM1, BM2, and BM3 in the inventive waterborne basecoat materials A4, A6, and A7 leads in all cases to improvement, in some cases significant, in the flop index in comparison to the noninventive waterborne basecoat material A1 containing the noninventive aqueous dispersion BM5.

4.3.2 Comparison of Inventive Waterborne Basecoat Materials A4, A6 and A7 with Noninventive Waterborne Basecoat Material A1 in Terms of Appearance after Condensation Exposure

| After condensation exposure | A1 | A4 | A6 | A7 |
|---|---|---|---|---|
| LW: | 2.3 | 2.8 | 1.8 | 2.6 |
| SW: | 18.5 | 9.3 | 9.9 | 13.9 |
| DOI: | 82.2 | 85.5 | 87.3 | 85.1 |

| After condensation exposure | A1 | A4 | A6 | A7 |
|---|---|---|---|---|
| Swelling: | cOK | OK | OK | OK |
| Blistering | m1/g1 | m0/g0 | m0/g0 | m0/g0 |

OK = satisfactory
cOK = conditionally satisfactory
m = number of blisters
g = size of blisters In terms of swelling and blistering after condensation exposure, the noninventive waterborne basecoat material A1 containing the noninventive dispersion BM5 exhibits weaknesses, whereas the waterborne basecoat materials comprising the aqueous dispersions of the invention are all classified as satisfactory.

Relative to the reference (waterborne basecoat material A1 based on BM5), the waterborne basecoat materials A4, A6 and A7 based on BM1, BM2 and BM3 exhibit advantages in terms of shortwave (SW) and also DOI after condensation exposure.

The invention claimed is:

1. A method of preparing an aqueous dispersion comprising at least one polymer, the method comprising:
   i. polymerizing a mixture of olefinically unsaturated monomers A by emulsion polymerization in water, using at least one emulsifier and at least one water-soluble initiator, wherein
      a polymer prepared from the monomers A has a glass transition temperature of 10 to 55° C.,
   ii. separately polymerizing a mixture of olefinically unsaturated monomers B by emulsion polymerization in water, using at least one emulsifier and at least one water-soluble initiator, and adding the polymerized mixture of olefinically unsaturated monomers B to the polymer obtained under i.,
      wherein
      a monomers concentration of 6.0 wt % in the reaction solution is not exceeded throughout the reaction period, and
      the mixture of olefinically unsaturated monomers B comprises at least one polyolefinically unsaturated monomer,
   iii. separately polymerizing a mixture of olefinically unsaturated monomers C by emulsion polymerization in water, using at least one emulsifier and at least one water-soluble initiator, and adding the polymerized mixture of olefinically unsaturated monomers C to the polymer obtained under ii.,
      wherein
      a monomers concentration of 6.0 wt % in the reaction solution is not exceeded throughout the reaction period, and
   iv. adjusting the pH of the reaction solution to a pH of 6.5 to 9.0,
      wherein
      a. the mixture of olefinically unsaturated monomers A comprises from 0 wt % to less than 50.0 wt % of one or more monomers having a solubility in water of <0.5 g/l at 25° C.,
         a monomers A concentration of 6.0 wt % in the reaction solution from stage i. is not exceeded,
         and the resulting polymer after stage i. has a particle size of 20 to 110 nm,
      b. a polymer prepared from the monomers B has a glass transition temperature of −35 to 12° C., and the resulting polymer after stage ii. has a particle size of 130 to 200 nm,
c. a polymer prepared from the monomers C has a glass transition temperature of −50 to 15° C., and
the resulting polymer after stage iii. has a particle size of 150 to 280 nm.

2. The method of claim 1, wherein the mass of the monomer mixture A, based on the total mass of the monomer mixtures A, B and C, is 1 to 10%, the mass of the monomer mixture B, based on the total mass of the monomer mixtures A, B and C, is 60 to 80%, and the mass of the monomer mixture C, based on the total mass of the monomer mixtures A, B and C, is 10 to 30%.

3. The method of claim 1, wherein the emulsifiers used under i., ii., and iii. are selected, independently of one another, from the group consisting of ethoxylated and propoxylated alkanols having 10 to 40 carbon atoms.

4. The method of claim 1, wherein the monomer mixture A comprises at least one monounsaturated ester of (meth)acrylic acid having an unsubstituted alkyl radical and/or at least one vinylically monounsaturated monomer having an aromatic radical on the vinyl group.

5. The method of claim 1, wherein the monomer mixture B comprises at least one polyolefinically unsaturated monomer and at least one monounsaturated ester of (meth)acrylic acid having an unsubstituted alkyl radical.

6. The method of claim 1, wherein the monomer mixture C comprises at least one alpha-beta unsaturated carboxylic acid, at least one monounsaturated ester of (meth)acrylic acid having an alkyl radical substituted by one or more hydroxyl groups and at least one monounsaturated ester of (meth)acrylic acid having an unsubstituted alkyl radical.

7. A pigmented aqueous basecoat material which comprises at least one aqueous dispersion prepared according to the method of claim 1.

8. The pigmented aqueous basecoat material of claim 7, wherein the weight percentage fraction, based on the total weight of the pigmented aqueous basecoat material, of the at least one polymer comprised in the aqueous dispersion of claim 1 is 1.0 to 24.0 wt %.

9. The pigmented aqueous basecoat material of claim 7, which comprises as a binder at least one polyurethane resin.

10. The pigmented aqueous basecoat material of claim 7, which comprises a polyurethane resin, said resin being grafted by means of olefinically unsaturated monomers and also containing hydroxyl groups, and also a melamine resin.

11. A method of using an aqueous dispersion prepared according to the method of claim 1, said method comprising using the aqueous dispersion in pigmented aqueous basecoat materials for improving adhesion.

12. A process for producing a multicoat paint system, in which
(1) a pigmented aqueous basecoat material is applied to a substrate,
(2) a polymer film is formed from the coating material applied in stage (1),
(3) a clearcoat material is applied to the resulting basecoat film, and subsequently
(4) the basecoat film is cured together with the clearcoat film,
wherein a pigmented aqueous basecoat material of claim 7 is used in stage (1).

13. The process of claim 12, wherein the substrate from stage (1) is a multicoat paint system which possesses defect sites.

14. A multicoat paint system producible by the process of claim 12.

* * * * *